US008470913B2

(12) United States Patent
Ichinose

(10) Patent No.: US 8,470,913 B2
(45) Date of Patent: Jun. 25, 2013

(54) THERMOSETTING RESIN COMPOSITION AND CURED PRODUCT OF THE SAME

(75) Inventor: Eijyu Ichinose, Sakura (JP)

(73) Assignee: DIC Corporation, Tokyo (JP)

( * ) Notice: Subject to any disclaimer, the term of this patent is extended or adjusted under 35 U.S.C. 154(b) by 20 days.

(21) Appl. No.: 13/375,118

(22) PCT Filed: May 24, 2010

(86) PCT No.: PCT/JP2010/058724

§ 371 (c)(1),
(2), (4) Date: Feb. 15, 2012

(87) PCT Pub. No.: WO2010/137548

PCT Pub. Date: Dec. 2, 2010

(65) Prior Publication Data

US 2012/0142829 A1 Jun. 7, 2012

(30) Foreign Application Priority Data

May 29, 2009 (JP) ................................ 2009-130411

(51) Int. Cl.

| | |
|---|---|
| ***C08K 5/34*** | (2006.01) |
| ***C08K 5/3435*** | (2006.01) |
| ***C08K 5/55*** | (2006.01) |
| ***B32B 15/081*** | (2006.01) |

(52) U.S. Cl.
USPC .............................. 524/99; 524/183; 428/458

(58) Field of Classification Search
USPC .................................... 524/99, 183; 428/458
See application file for complete search history.

(56) References Cited

U.S. PATENT DOCUMENTS

| | | | | |
|---|---|---|---|---|
| 3,959,233 | A * | 5/1976 | Hanson et al. | 428/378 |
| 2010/0018756 | A1 | 1/2010 | Shimeno et al. | |
| 2011/0034582 | A1* | 2/2011 | Dahling | 523/122 |

FOREIGN PATENT DOCUMENTS

| | | | |
|---|---|---|---|
| JP | 07-003016 | A | 1/1995 |
| JP | 07-179605 | A | 7/1995 |
| JP | 2003-292575 | A | 10/2003 |
| JP | 2006-022302 | A | 1/2006 |
| JP | 2007-138000 | A | 6/2007 |
| JP | 2008-207550 | A | 9/2008 |
| JP | 2009-024052 | A | 2/2009 |
| JP | 2010-024314 | A | 2/2010 |
| JP | 2010-053216 | A | 3/2010 |
| WO | WO-2008/072495 | A1 | 6/2008 |
| WO | WO-2010/074014 | A1 | 7/2010 |

OTHER PUBLICATIONS

International Search Report dated Aug. 31, 2010, issued for PCT/JP2010/058724.

Notification of Reasons for Refusal mailed Jan. 25, 2011, issued for Japanese patent application No. 2010-544518 and English translation thereof.

* cited by examiner

*Primary Examiner* — John J Figueroa
*Assistant Examiner* — Atnaf Admasu
(74) *Attorney, Agent, or Firm* — Edwards Wildman Palmer LLP

(57) ABSTRACT

An object of the present invention is to provide a thermosetting resin composition having high heat resistance, high flame retardancy, good mechanical properties, and high dimensional stability. To achieve the object, there are provided a thermosetting resin composition containing a polyimide resin and a boron compound represented by general formula below and a cured product of the thermosetting resin composition.

(b1)

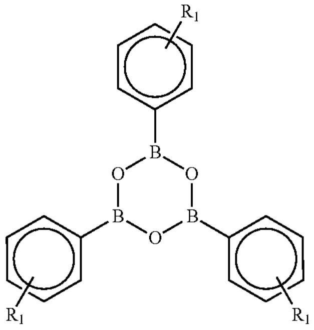

(b2)

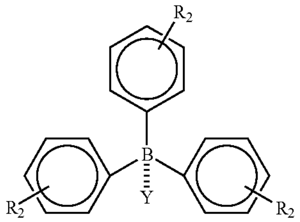

-continued (b3)

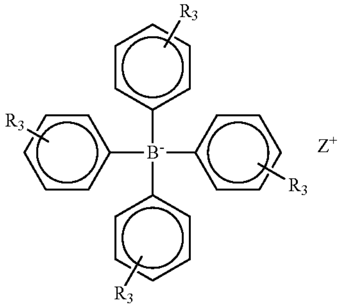

($R_1$'s each independently represent a hydrogen atom, an alkyl group having 1 to 4 carbon atoms, or an alkoxy group having 1 to 4 carbon atoms. $R_2$'s each independently represent hydrogen, an alkyl group having 1 to 4 carbon atoms, or an alkoxy group having 1 to 4 carbon atoms. Y represents a nitrogen-containing heterocyclic compound. $R_3$'s each independently represent a hydrogen atom, an alkyl group having 1 to 4 carbon atoms, or an alkoxy group having 1 to 4 carbon atoms. Z represents a nitrogen-containing heterocyclic compound.)

23 Claims, 2 Drawing Sheets

THERMOSETTING RESIN COMPOSITION AND CURED PRODUCT OF THE SAME

TECHNICAL FIELD

The present invention relates to a liquid thermosetting resin composition containing an imide resin that can be coated and cast. Specifically, the present invention relates to a thermosetting resin composition having improved heat resistance, flame retardancy, and mechanical properties, which are characteristics intrinsic to polyimide resins, and having high dimensional stability when the composition is formed into a film and cured.

BACKGROUND ART

In the fields of heat-resistant coating materials, electrical insulating materials such as interlayer insulating materials of printed wiring boards and insulating materials of semiconductors, and electrical and electronic industry covering build-up materials, resins for prepreg, and heat-resistant adhesives, a resin composition that can provide a cured product having high toughness, high heat resistance, and high flame retardancy achieved without halogens has been demanded. In particular, in the field of electronics industry covering computers and the like, downsizing such as a significant decrease in the thickness of substrates, e.g., flexible film substrates and rigid substrates, has been highly demanded. To satisfy such a demand, it is essential to improve the mechanical strength (toughness), heat resistance, dimensional stability, flame retardancy achieved without halogens, and resistance to pyrolysis at high temperature, of a protective layer, adhesive layer, and insulating layer of substrates.

Polyimide resins have high heat resistance and mechanical strength and thus are favorably used in the field of electrical and electronic industry. For example, a polyimide obtained by causing a reaction between pyromellitic acid anhydride and 4,4'-bis(4-aminobenzamide)-3,3'-dihydroxybiphenyl to obtain polyamic acid and then subjecting the polyamic acid to ring-opening through dehydration has been disclosed as a polyimide resin having high heat resistance, mechanical strength, and dimensional stability (e.g., refer to PTL 1). However, the polyimide resin disclosed in PTL 1 has insufficient solubility in a solvent. Thus, the polyimide resin has limited uses.

Therefore, a solvent-soluble polyimide resin having high solubility in a solvent has been actively studied in recent years. For example, an imide resin mainly composed of tetracarboxylic acid anhydride having a structure in which ester bonds are formed at both terminals of an alkylene in the form of an acid anhydride and a diamine compound having an oxyalkylene structure has been disclosed as a polyimide resin that has high solubility in a solvent and dissolution stability and that provides a flexible cured film (e.g., refer to PTL 2). However, since the imide resin disclosed in PTL 2 has an ester bond and an aliphatic ether structure, sufficient heat resistance, dimensional stability, flame retardancy, and resistance to pyrolysis at high temperature cannot be achieved.

Furthermore, a polyimide resin whose solubility in a solvent is improved by using, for example, an aliphatic and/or alicyclic component such as sebacic acid or cyclohexanedimethanol as a constituent component has been disclosed (e.g., refer to PTL 3). However, the polyimide resin disclosed in PTL 3 has an aliphatic structure or an alicyclic structure. Since excessively high solubility in a solvent is pursued, sufficient heat resistance, dimensional stability, flame retardancy, and resistance to pyrolysis at high temperature cannot be achieved.

Moreover, a polyimide resin having a carboxyl group, a linear hydrocarbon structure, a urethane bond, and an isocyanurate structure has been disclosed as a polyimide resin that is soluble in typical organic solvents (e.g., refer to PTL 4). The polyimide resin disclosed in PTL 4 is soluble in a solvent other than N-methylpyrrolidone, but the polyimide resin alone provides poor film-formation property and thus an epoxy resin needs to be used together. A cured film obtained by using an epoxy resin together has heat resistance, but insufficient dimensional stability, mechanical properties such as toughness, and resistance to pyrolysis at high temperature.

As described above, since efforts have been excessively concentrated on an improvement in the solubility in a solvent in recent years, a polyimide resin having high dimensional stability is currently not provided.

CITATION LIST

Patent Literature

PTL 1: Japanese Unexamined Patent Application Publication No. 7-179605

PTL 2: Japanese Unexamined Patent Application Publication No. 2006-22302

PTL 3: Japanese Unexamined Patent Application Publication No. 2007-138000

PTL 4: Japanese Unexamined Patent Application Publication No. 2003-292575

SUMMARY OF INVENTION

Technical Problem

An object of the present invention is to provide a thermosetting resin composition having high heat resistance and good mechanical properties, which are characteristics intrinsic to polyimide resins, and high dimensional stability when the composition is cured, and a cured product obtained by curing the composition.

Solution to Problem

As a result of eager study, the inventors of the present invention have found that a resin composition containing an imide resin and a specific boron compound provides a cured film having high flame retardancy, high heat resistance, good mechanical properties, high resistance to pyrolysis at high temperature, and high dimensional stability and that a resin composition further having high storage stability and solubility in a solvent while retaining the above-described characteristics is obtained by using, among imide resins, polyimides having high solubility in a solvent and disclosed in PTLs 2 to 4. Thus, the present invention has been completed.

The present invention provides a thermosetting resin composition containing a polyimide resin (A) and at least one boron compound (B) selected from the group consisting of compounds represented by general formulae (b1) to (b3) below.

[Chem. 1]

(b1)

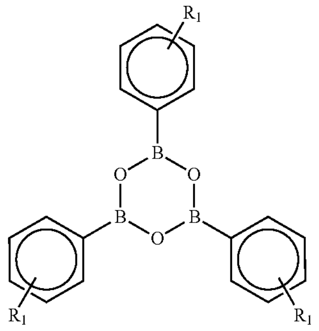

(In the formula, $R_1$'s each independently represent a hydrogen atom, an alkyl group having 1 to 4 carbon atoms, or an alkoxy group having 1 to 4 carbon atoms.)

[Chem. 2]

(b2)

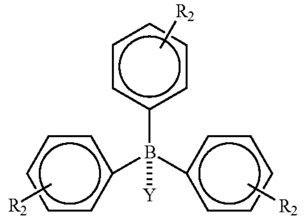

(In the formula, $R_2$'s each independently represent hydrogen, an alkyl group having 1 to 4 carbon atoms, or an alkoxy group having 1 to 4 carbon atoms. Y represents a nitrogen-containing heterocyclic compound.)

[Chem. 3]

(b3)

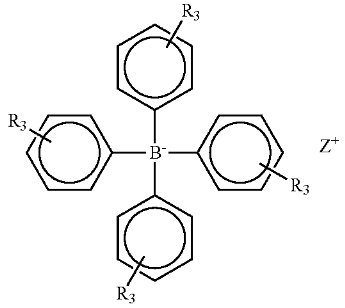

(In the formula, $R_3$'s each independently represent a hydrogen atom, an alkyl group having 1 to 4 carbon atoms, or an alkoxy group having 1 to 4 carbon atoms. Z represents a nitrogen-containing heterocyclic compound.)

The present invention also provides a cured product obtained by curing the thermosetting resin composition.

Advantageous Effects of Invention

When the thermosetting resin composition of the present invention is formed into a film, the film has high flame retardancy, toughness, heat resistance, resistance to pyrolysis at high temperature, and dimensional stability and is useful for coating materials, interlayer insulating films for wiring, adhesives, and the like.

DESCRIPTION OF EMBODIMENTS

Figure 1:
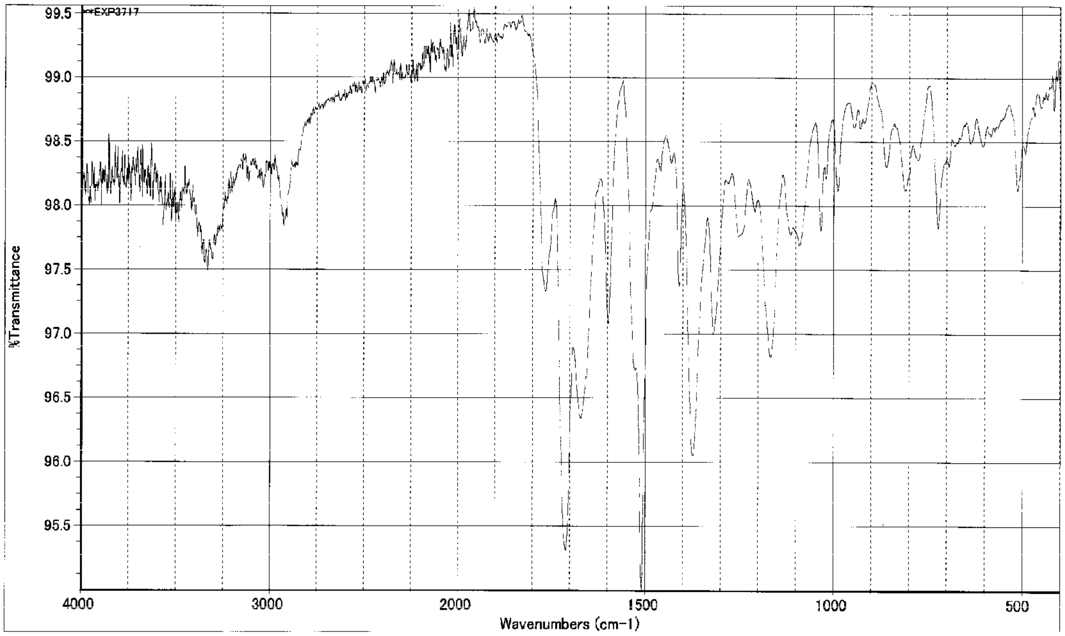
FIG. 1 is an infrared absorption spectrum of a polyimide resin obtained in Synthesis Example 1.

A polyimide resin (A) used in the present invention has a cyclic five-membered ring imide bond. For example, a polyimide resin that can be dissolved or dispersed in a solvent can be used as such a polyimide resin. Any polyimide resin (A) can be used as long as it is liquefied when being heated, for example, at 120° C., and a polyimide resin that is in a liquid state at room temperature is preferably used.

The polyimide resin that has a cyclic five-membered ring imide bond and can be dissolved or dispersed in a solvent can be produced, for example, by an amic acid method in which polyamic acid obtained through a reaction between an acid anhydride-containing compound and a polyamine compound is further dehydrated to form a cyclic imide bond or an isocyanate method in which an acid anhydride-containing compound is caused to react with a polyisocyanate compound and decarboxylation is performed to form a cyclic imide bond.

If the amic acid method is employed as a method for producing the polyimide resin (A) used in the present invention, a polar solvent needs to be used to maintain the solubility and stability of an amic acid, which is an intermediate product. Therefore, the isocyanate method is preferred. The isocyanate method also has an advantage in that a polyimide resin having high compatibility with a boron compound (B) described below is easily obtained.

As described above, the polyimide resin (A) used in the present invention is preferred because the polyimide resin that is dissolved or dispersed in a solvent provides high mixing workability of components and high stability of a composition. For example, a polyimide resin having a structure represented by general formula (a1) below can be preferably exemplified as such a polyimide resin.

[Chem. 4]

(a1)

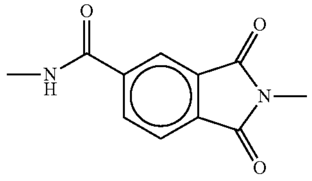

When the polyimide resin (A) used in the present invention is the polyimide resin having the structure represented by the general formula (a1), the content of the structure represented by the general formula (a1) is preferably 1 to 50% by mass and more preferably 5 to 50% by mass based on the solid content of the polyimide resin to provide a polyimide resin having high solubility in a solvent and a cured product having high heat resistance, good mechanical properties such as tensile strength and elongation, and high dimensional stability. The content is more preferably 10 to 45% by mass and further preferably 10 to 40% by mass to decrease the crystallinity in the thermosetting resin composition of the present invention and to provide a cured product having high heat resistance, good mechanical properties such as tensile elongation, and high dimensional stability.

An example of the polyimide resin having the structure represented by the general formula (a1) is a polyimide resin having a divalent structural unit represented by general formula (a1-2).

[Chem. 5]

(a1-2)

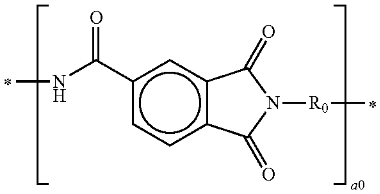

($R_0$ represents a divalent diamine or a residual structure obtained by removing an amine group and an isocyanate group from diisocyanate, a0 indicates a repetition and is 1 to 1000, and * represents a bonding point.)

Among the polyimide resins having the structure represented by the general formula (a1-2), a polyimide resin having one or more structures represented by general formulae (a1-3) to (a1-8) is preferred because a cured product having good mechanical properties such as tensile strength and elongation is obtained and such a polyimide resin is easily dissolved in a solvent. A polyimide resin having a structure represented by general formula (a1-7) or (a1-8) is further preferred because a coefficient of linear expansion can be decreased.

[Chem. 6]

(a1-3)

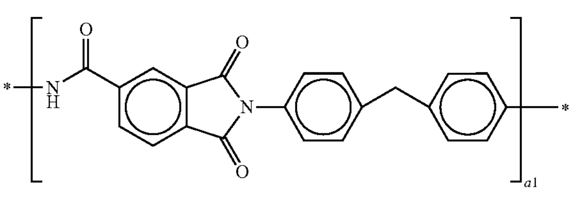

(a1-4)

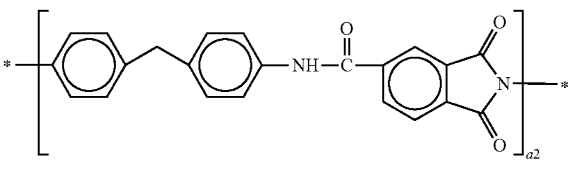

-continued

[Chem. 7]

(a1-5)

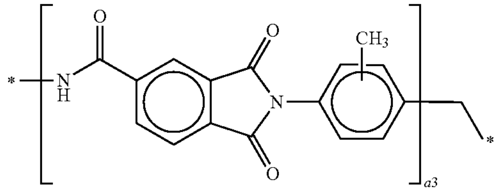

(a1-6)

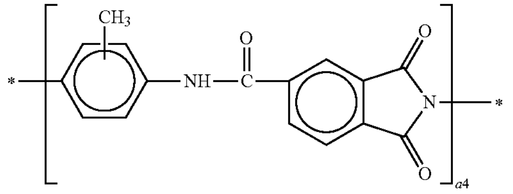

[Chem. 8]

(a1-7)

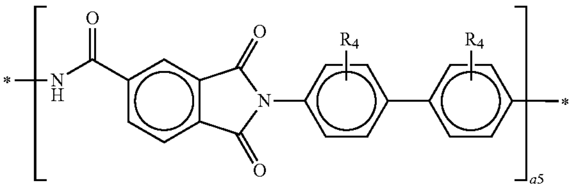

(a1-8)

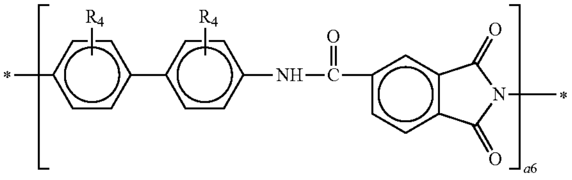

In the structures represented by the general formulae (a1-3) to (a1-8), * represents a bonding point and $R_4$'s each independently represent a hydrogen atom or a hydrocarbon group having 1 to 9 carbon atoms. Furthermore, a1, a2, a3, a4, a5, and a6 each represent the number of repetitions of the structural unit in the parentheses and are each 1 to 1000.

When the polyimide resin (A) used in the present invention is the polyimide resin having the structure represented by the general formula (a1-2), the content of the structure represented by the general formula (a1-2) is preferably 1 to 98% by mass and more preferably 10 to 95% by mass based on the solid content of the polyimide resin to provide a polyimide resin having high solubility in a solvent and a cured product having high heat resistance, good mechanical properties such as tensile strength and elongation, and high dimensional stability. The content is more preferably 2 to 90% by mass and further preferably 5 to 80% by mass to decrease the crystallinity in the thermosetting resin composition of the present invention and to provide a thermosetting resin composition having high storage stability.

When the polyimide resin (A) used in the present invention is the polyimide resin having the one or more structures represented by the general formulae (a1-3) to (a1-8), the contents of the structures represented by the general formulae (a1-3) to (a1-8) are each preferably 1 to 98% by mass based on the solid content of the polyimide resin to provide a polyimide resin having high solubility in a solvent and a cured product having high heat resistance, good mechanical properties such as tensile strength and elongation, and high dimensional stability. The contents are each more preferably 2 to 90% by mass and further preferably 5 to 80% by mass to decrease the crystallinity in the thermosetting resin composition of the present invention and to provide a thermosetting resin composition having high storage stability.

Furthermore, the polyimide resin (A) used in the present invention is preferably a polyimide resin having a divalent structural unit represented by general formula (a2) below because high solubility in a solvent and compatibility are achieved and a thermosetting resin composition to be cured into a cured film having high toughness and heat resistance can be obtained.

[Chem. 9]

(a2)

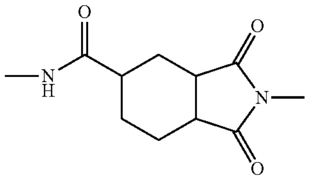

An example of the polyimide resin having the structure represented by the general formula (a2) is a polyimide resin having a structure represented by general formula (a2-2).

[Chem. 10]

(a2-2)

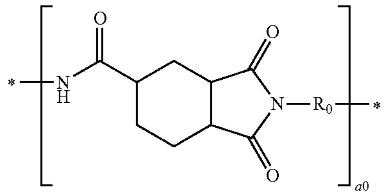

($R_0$ represents a divalent diamine or a residue obtained by removing an amine group and an isocyanate group from diisocyanate, a0 indicates a repetition and is 1 to 1000, and * represents a bonding point.)

Among the polyimide resins having the structure represented by the general formula (a2-2), a polyimide resin having one or more structures represented by general formulae (a2-3) to (a2-8) is preferred because a cured product having good mechanical properties such as tensile strength and elongation is obtained and such a polyimide resin is easily dissolved in a solvent. A polyimide resin having a structure represented by general formula (a2-7) or (a2-8) is further preferred because a cured product having a low coefficient of linear expansion (high dimensional stability) is obtained.

[Chem. 11]

(a2-3)

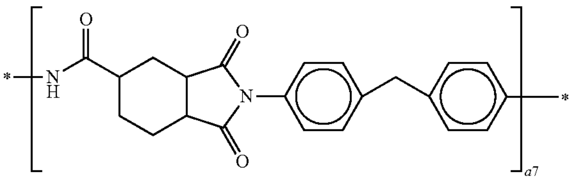

(a2-4)

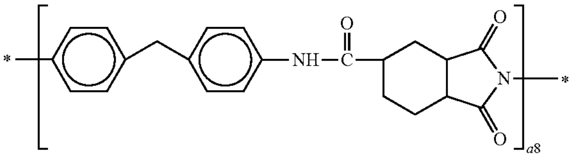

[Chem. 12]

(a2-5)

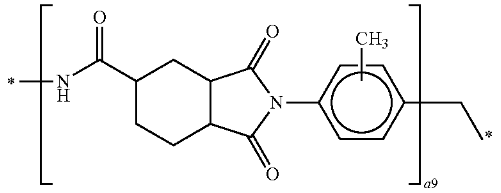

(a2-6)

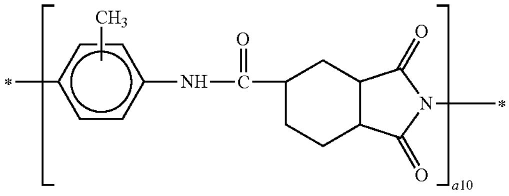

[Chem. 13]

(a2-7)

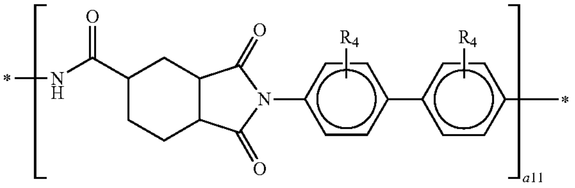

(a2-8)

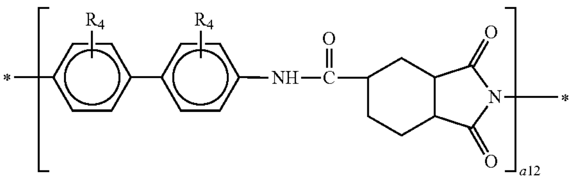

In the structures represented by the general formulae (a2-3) to (a2-8), * represents a bonding point and $R_4$'s each independently represent a hydrogen atom or a hydrocarbon group having 1 to 9 carbon atoms. Furthermore, a7, a8, a9, a10, a11, and a12 each represent the number of repetitions of the structural unit in the parentheses and are each 1 to 1000.

When the polyimide resin (A) used in the present invention is the polyimide resin having the structure represented by the general formula (a2), the content of the structure represented by the general formula (a2) is preferably 1 to 98% by mass and more preferably 10 to 95% by mass based on the solid content of the polyimide resin to provide a polyimide resin having high solubility in a solvent and a cured product having high heat resistance, good mechanical properties such as tensile strength and elongation, and high dimensional stability. The content is more preferably 2 to 90% by mass and further preferably 5 to 80% by mass to decrease the crystallinity in the thermosetting resin composition of the present invention and to provide a thermosetting resin composition having high storage stability.

When the polyimide resin (A) used in the present invention is the polyimide resin having the one or more structures represented by the general formulae (a2-3) to (a2-8), the contents of the structures represented by the general formulae (a2-3) to (a2-8) are each preferably 1 to 98% by mass based on the solid content of the polyimide resin to provide a polyimide resin having high solubility in a solvent and a cured product having high heat resistance, good mechanical properties such as tensile strength and elongation, and high dimensional stability. The contents are each more preferably 2 to 90% by mass and further preferably 5 to 80% by mass to decrease the crystallinity in the thermosetting resin composition of the present invention and to provide a thermosetting resin composition having high storage stability.

The polyimide resin (A) is preferably a polyimide resin having the structure represented by the general formula (a2-7) or (a2-8) in a molality of 0.02 to 2.0 mmol/g based on the solid content by mass of the polyimide resin (A) to provide a polyimide resin having high solubility in a solvent and a cured product having high heat resistance, good mechanical properties such as tensile strength and elongation, and high dimensional stability.

In the case where the polyimide resin (A) has the structure represented by the general formula (a1-7), (a1-8), (a2-7), or (a2-8), $R_4$'s preferably represent a methyl group because a cured product having higher heat resistance, better mechanical properties such as tensile strength and elongation, and higher dimensional stability is obtained.

The polyimide resin (A) is preferably a polyimide resin having the structures represented by the general formula (a1-7) or (a1-8) and the general formula (a2-7) or (a2-8) to provide a cured product having high heat resistance, good mechanical properties such as tensile strength and elongation, and high dimensional stability.

The polyimide resin (A) preferably has solubility in a solvent. In particular, the polyimide resin (A) is preferably dissolved in gamma-butyrolactone at 25° C. so as to have a concentration of 10% by mass because a structure that is soluble in gamma-butyrolactone contributes to high solubility and stability over time of a curing composition.

The polyimide resin (A) preferably has a structure represented by general formula (3a) below to provide a composition having high toughness such as breaking strength.

[Chem. 14]

(a3)

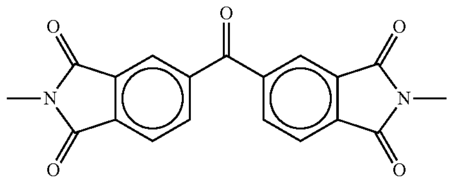

An example of the polyimide resin having the structure represented by the general formula (a3) is a polyimide resin having a structure below.

[Chem. 15]

(a3-1)

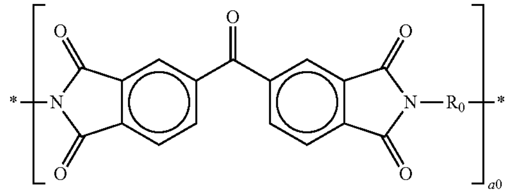

($R_0$ represents a divalent diamine or a residue obtained by removing an isocyanate group from diisocyanate, a0 indicates a repetition and is 1 to 1000, and * represents a bonding point.)

Among the polyimide resins having the structure represented by the general formula (a3), polyimide resins having structures below are preferred because high stability of the polyimide resin (A) is achieved and a cured product having high heat resistance, good mechanical properties such as tensile strength and elongation, and high dimensional stability is obtained.

(a3-2)

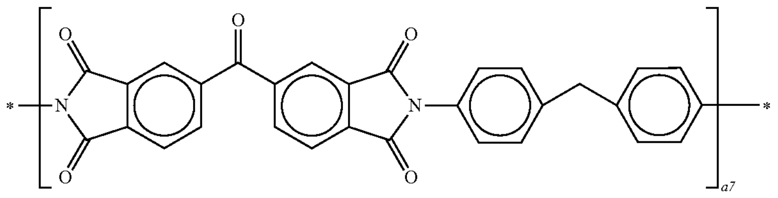

[Chem. 16]

-continued (a3-3)

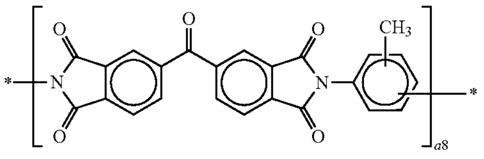

[Chem. 17]

(a3-4)

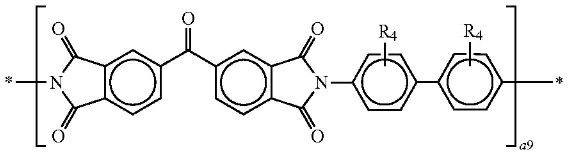

[Chem. 18]

In the structures represented by the general formulae (a3-2) to (a3-4), * represents a bonding point and $R_4$'s each independently represent a hydrogen atom or a hydrocarbon group having 1 to 9 carbon atoms. Furthermore, a7, a8, and a9 each represent the number of repetitions of the structural unit in the parentheses and are each 1 to 1000.)

The polyimide resin (A) used in the present invention is preferably soluble in an organic solvent. Examples of the organic solvent used include polar organic solvents having high solvency, such as N-methylpyrrolidone, dimethylacetamide, and methylformamide that have been conventionally used. However, an imide resin that dissolves only in a nitrogen-containing polar solvent such as N-methyl pyrrolidone poses a problem such as whitening caused by its moisture absorbency. Thus, such an imide resin has insufficient storage stability. Therefore, a film formed of the resin poses a problem in that a tough film and good electrical characteristics inherently provided from an imide resin are not obtained. For this reason, an imide resin that is soluble in an organic solvent having relatively low solvency, such as gamma-butyrolactone (γ-butyrolactone), is further preferred.

The polyimide resin (A) used in the present invention is preferably dissolved at about room temperature such as 10 to 30° C., but a crystalline imide resin that is dissolved by heating, for example, at 100 to 150° C. can also be used. In particular, an imide resin having solubility at 10 to 120° C. is more preferably used because the workability of forming a film is improved.

In the present invention, whether the polyimide resin (A) used in the present invention is dissolved in an organic solvent can be determined by adding the polyimide resin used in the present invention to the organic solvent so as to have a concentration of 10% by mass, leaving it to stand at 25° C. for 7 days, and then visually observing the appearance.

The polyimide resin (A) used in the present invention is preferably a polyimide resin that is soluble in gamma-butyrolactone because high storage stability is achieved. Furthermore, a polyimide resin that is soluble in gamma-butyrolactone when the polyimide resin is dissolved in gamma-butyrolactone at 25° C. so as to have a concentration of 10% by mass is preferred. The polyimide resin that is soluble in gamma-butyrolactone can be obtained by, for example, a method for producing a polyimide resin described below.

The polyimide resin (A) used in the present invention may be a polyimide resin having a linear structure or a polyimide resin having a branched structure. The polyimide resin (A) may have, as a copolymerization component, a structure of polyester imide subjected to polyester modification or polyurethane imide subjected to urethane modification.

Examples of the terminal structure of the polyimide resin (A) used in the present invention include structures of carboxylic acid, carboxylic acid anhydride, an isocyanate group, an amine group, and the like. A structure of carboxylic acid or carboxylic acid anhydride is preferably employed as the terminal structure in consideration of high stability of the polyimide resin itself of the present invention and high stability after the polyimide resin is mixed with an organic solvent and other resins. When the terminal structure is a structure of carboxylic acid or carboxylic acid anhydride, an acid value of 1 to 50 on a solid content basis provides an easy-to-handle polyimide resin. As a result, a film or molded product having high mechanical strength and dimensional stability is obtained.

The molecular weight of the polyimide resin (A) used in the present invention is preferably 1000 to 200000 and more preferably 2000 to 100000 because an easy-to-handle polyimide resin is provided and a film or molded product having high mechanical strength and dimensional stability is obtained. The molecular weight can be measured by GPC or the quantification of terminal functional groups.

The polyimide resin (A) that can be used in the present invention can be produced by, for example, the following method.

Production method 1: a method in which imidization is directly performed using a polyisocyanate compound and a compound having an acid anhydride group (isocyanate method)

Production method 2: a method in which a compound having an acid anhydride group is caused to react with a diamine compound to synthesize amic acid, and then the amic acid is dehydrated to cause imide ring closure The polyimide resin used in the present invention is preferably produced by the isocyanate method (a method for producing a polyimide resin by causing a diisocyanate compound to react with a compound having an acid anhydride group) because the residual amount of water is decreased and the physical properties are satisfactorily maintained, the reaction is easily controlled, and polyimide resins subjected to various modifications are easily produced.

Examples of the diamine compound used in the Production method 2 include 4,4-diaminodicyclohexylmethane, isophoronediamine, ethylenediamine, tetramethylenediamine, norbornanediamine, p-xylylenediamine, 1,3-bis(aminomethyl) cyclohexane, 1,3-diaminocyclohexane, hexamethylenediamine, polyethylene glycol bis(3-aminopropyl)ether, m-xylylenediamine, 4,4-methylenebis(cyclohexylamine), bicyclohexyldiamine, and siloxane diamine. These diamines may be used alone or in combination. In particular, in terms of ease of increasing the molecular weight and high heat resistance, examples of the diamine compound include alicyclic diamines such as 4,4-diaminodicyclohexylmethane, isophoronediamine, and 1,3-diaminocyclohexane; and aromatic diamines such as oxydianiline, diaminodiphenylmethane, 1,3-phenylenediamine, 1,4-phenylenediamine, dimethylbenzidine, dimethoxybenzidine, diaminodiphenyl sulfide, diaminodiphenyl sulfoxide, diaminodiphenyl sulfone, diaminobenzophenone, 2,2-bis(3-aminophenyl)propane, 2,2-bis(4-aminophenyl)propane, 2,2-bis[4-(4-aminophenoxy)phenyl]-1,1,1,3,3,3-hexafluoropropane, 1,4-bis(3-aminophenoxy)benzene, 1,4-bis(4-aminophenoxy)benzene, 1,3-bis(3-aminophenoxy)benzene, 1,3-bis(4-aminophenoxy)benzene, 4,4-bis(3-aminophenoxy)biphenyl, 4,4-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]ether, bis[4-(4-aminophenoxy)phenyl]ether, and 4,4'-diamino-3,3'-dimethyl-1,1'-biphenyl. These diamines may be used alone or in combination.

Examples of the polyisocyanate compound include aromatic polyisocyanate compounds and aliphatic polyisocyanate compounds.

Examples of the aromatic polyisocyanate compounds include p-phenylene diisocyanate, m-phenylene diisocyanate, p-xylene diisocyanate, m-xylene diisocyanate, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, m-xylene diisocyanate, p-xylene diisocyanate, 1,3-bis(α,α-dimethylisocyanatomethyl)benzene, tetramethylxylylene diisocyanate, diphenylene ether-4,4'-diisocyanate, naphthalene diisocyanate, and diisocyanates having a biphenyl skeleton and represented by general formula (a4) below.

[Chem. 19]

(a4)

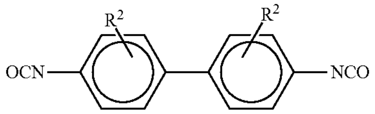

(In the formula, $R_2$'s each independently represent a hydrogen atom or a hydrocarbon group that has 1 to 9 carbon atoms and may be fluorine-modified.)

Examples of the diisocyanate represented by the general formula (a4) include 4,4'-diisocyanate-3,3'-dimethyl-1,1'-biphenyl, 4,4'-diisocyanate-3,3'-diethyl-1,1'-biphenyl, 4,4'-diisocyanate-2,2'-dimethyl-1,1'-biphenyl, 4,4'-diisocyanate-2,2'-diethyl-1,1'-biphenyl, 4,4'-diisocyanate-3,3'-ditrifluoromethyl-1,1'-biphenyl, and 4,4'-diisocyanate-2,2'-ditrifluoromethyl-1,1'-biphenyl.

Examples of the aliphatic polyisocyanate compounds include hexamethylene diisocyanate, lysine diisocyanate, trimethylhexamethylene diisocyanate, isophorone diisocyanate, 4,4'-dicyclohexylmethane diisocyanate, hydrogenated xylene diisocyanate, and norbornene diisocyanate.

An isocyanate prepolymer obtained by causing a reaction between the above-described polyisocyanate compound and polyol components under an isocyanate group excessive condition may be used as the polyisocyanate compound.

The polyimide resin used in the present invention may have a branched structure to improve the solubility in a solvent and the compatibility with other resins. To achieve such a branched structure, a trifunctional or higher polyisocyanate compound having an isocyanurate ring, which is an isocyanurate of the above-described diisocyanate compound or the like, a biuret, adduct, or allophanate of the above-described diisocyanate, polymethylene polyphenyl polyisocyanate (crude MDI), or the like may be used as the polyisocyanate compound.

An aromatic diisocyanate compound is preferably used as the polyisocyanate compound because the mechanical properties such as mechanical strength and breaking elongation and heat resistance of a cured product to be obtained are improved. Among the aromatic diisocyanate compounds, 4,4'-diphenylmethane diisocyanate, tolylene diisocyanate, and 4,4'-diisocyanate-3,3'-dimethyl-1,1'-biphenyl are more preferably used. By using one or more of the diisocyanate compounds, preferably by combining two or more of the diisocyanate compounds, a cured product having high solubility in a solvent, good mechanical properties, and high heat resistance can be favorably provided. Furthermore, by using one or more of the diisocyanate compounds including 4,4'-diisocyanate-3,3'-dimethyl-1,1'-biphenyl, preferably by combining two or more of the diisocyanate compounds, a cured product further having high dimensional stability can be favorably provided.

Herein, 4,4'-diisocyanate-3,3'-dimethyl-1,1'-biphenyl is preferably used in an amount of 50% or more by mass relative to the total mass of the polyisocyanate compound to provide a cured product having good mechanical properties such as mechanical strength and breaking elongation and high heat resistance.

The amount of the polyisocyanate compound used is preferably 10 to 70 mol %, more preferably 10 to 60 mol %, and further preferably 30 to 60 mol % relative to the total molar quantity of raw materials constituting the polyimide resin.

Examples of the compound having an acid anhydride group include aromatic tricarboxylic acid anhydrides, alicyclic tricarboxylic acid anhydrides, and tetracarboxylic acid anhydrides. Examples of the aromatic tricarboxylic acid anhydrides include trimellitic anhydride and naphthalene-1,2,4-tricarboxylic acid anhydride.

An example of the alicyclic tricarboxylic acid anhydrides includes cyclohexanetricarboxylic acid anhydride. Examples of the cyclohexanetricarboxylic acid anhydride include cyclohexane-1,3,4-tricarboxylic acid-3,4-anhydride, cyclohexane-1,3,5-tricarboxylic acid-3,5-anhydride, and cyclohexane-1,2,3-tricarboxylic acid-2,3-anhydride.

Examples of the tetracarboxylic acid anhydrides include pyromellitic acid dianhydride, benzophenone-3,3',4,4'-tetracarboxylic acid dianhydride, diphenyl ether-3,3',4,4'-tetracarboxylic acid dianhydride, benzene-1,2,3,4-tetracarboxylic acid dianhydride, biphenyl-3,3',4,4'-tetracarboxylic acid dianhydride, biphenyl-2,2',3,3'-tetracarboxylic acid dianhydride, naphthalene-2,3,6,7-tetracarboxylic acid dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,3,9,10-tetracarboxylic acid dianhydride, perylene-3,4,9,10-tetracarboxylic acid dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis(2,3-dicarboxyphenyl)propane dianhydride, 2,3-bis(3,4-dicarboxyphenyl)propane dianhydride, bis(3,4-dicarboxyphenyl)sulfone dianhydride, bis(3,4-dicarboxyphenyl)ether dianhydride, ethylene glycol-bis(anhydrotrimellitate), propylene glycol-bis(anhydrotrimellitate), butanediol-bis(anhydrotrimellitate), hexamethylene glycol-bis(anhydrotrimellitate), polyethylene glycol-bis(anhydrotrimellitate), polypropylene glycol-bis(anhydrotrimellitate), and other alkylene glycol-bis(anhydrotrimellitate).

Among the compounds having an acid anhydride group, trimellitic anhydride, cyclohexanetricarboxylic acid anhydride, pyromellitic acid dianhydride, benzophenone-3,3',4,4'-tetracarboxylic acid dianhydride, diphenyl ether-3,3',4,4'-tetracarboxylic acid dianhydride, biphenyl-3,3',4,4'-tetracarboxylic acid dianhydride, biphenyl-2,2',3,3'-tetracarboxylic acid dianhydride, and ethylene glycol-bis (anhydrotrimellitate) are preferably used.

Among the cyclohexanetricarboxylic acid anhydrides, cyclohexane-1,3,4-tricarboxylic acid-3,4-anhydride is preferably used to achieve high solubility in a solvent and to provide a cured product having good mechanical properties such as mechanical strength and breaking elongation and high heat resistance.

The above-described cyclohexanetricarboxylic acid anhydride may be mixed unless impurities such as cyclohexane-1,2,4-tricarboxylic acid that are used as production materials do not impair the curing in the present invention. For example, the amount of the cyclohexanetricarboxylic acid anhydride is 10% or less by mass and preferably 5% or less by mass.

To achieve high solubility in a solvent and to provide a cured product having a good balance between mechanical properties and heat-resisting properties, the polyimide resin (A) is preferably a polyimide resin obtained by combining cyclohexanetricarboxylic acid anhydride with trimellitic anhydride, a polyimide resin obtained by combining cyclohexanetricarboxylic acid anhydride with benzophenone-3,3',4,4'-tetracarboxylic acid dianhydride, or a polyimide resin obtained by combining cyclohexanetricarboxylic acid anhydride with pyromellitic acid dianhydride. Furthermore, the polyimide resin (A) is more preferably a polyimide resin obtained by combining cyclohexanetricarboxylic acid anhydride with at least two selected from the group of trimellitic anhydride, benzophenone-3,3',4,4'-tetracarboxylic acid dianhydride, and pyromellitic acid dianhydride. The polyimide resin (A) is further preferably a polyimide resin obtained by combining cyclohexanetricarboxylic acid anhydride, trimellitic anhydride, and benzophenone-3,3',4,4'-tetracarboxylic acid dianhydride with each other.

The amount of the cyclohexanetricarboxylic acid anhydride used is preferably 5 to 100 mol % and more preferably 10 to 80 mol % relative to the amount of all the acid anhydride compounds constituting the imide resin to provide a polyimide resin having high solubility in a solvent and a cured product having good mechanical properties and high heat resistance. Furthermore, the amount of the cyclohexanetricarboxylic acid anhydride used is preferably 2 to 60 mol % and more preferably 5 to 50 mol % relative to the total molar quantity of all raw materials constituting the polyimide resin.

In the case where trimellitic anhydride is used as an acid anhydride together with cyclohexanetricarboxylic acid anhydride, the amount of cyclohexanetricarboxylic acid anhydride used is preferably 5 to 90 mol % and more preferably 10 to 50 mol % relative to the total molar quantity of the acid anhydride compounds, and the amount of trimellitic anhydride used is preferably 20 to 90 mol % and more preferably 40 to 90 mol % relative to the total molar quantity of the acid anhydride compounds. Furthermore, the amounts of the cyclohexanetricarboxylic acid anhydride and trimellitic anhydride used are preferably 2 to 60 mol % and 2 to 60 mol %, respectively, relative to the total molar quantity of all raw materials constituting the polyimide resin.

In the case where trimellitic anhydride and benzophenone-3,3',4,4'-tetracarboxylic acid dianhydride are used as acid anhydrides together with cyclohexanetricarboxylic acid anhydride, the amount of cyclohexanetricarboxylic acid anhydride used is preferably 5 to 90 mol % and more preferably 10 to 80 mol % relative to the total molar quantity of the acid anhydrides constituting the imide resin, the amount of trimellitic anhydride used is preferably 2 to 80 mol % and more preferably 10 to 80 mol % relative to the total molar quantity of the acid anhydrides, and the amount of benzophenone-3,3',4,4'-tetracarboxylic acid dianhydride used is preferably 3 to 50 mol % and more preferably 5 to 30 mol % relative to the total molar quantity of the acid anhydrides. Furthermore, the amounts of the cyclohexanetricarboxylic acid anhydride, trimellitic anhydride, and benzophenone-3,3',4,4'-tetracarboxylic acid dianhydride used are preferably 2 to 60 mol %, 2 to 60 mol %, and 2 to 60 mol %, respectively, relative to the total molar quantity of all raw materials constituting the polyimide resin.

In the production method 1, a polyisocyanate compound reacts with a compound having an acid anhydride group. The ratio (ma)/(mb) of the number of moles (ma) of the isocyanate group in the polyisocyanate compound to the total number of moles (mb) of the acid anhydride group and carboxyl group in the compound having an acid anhydride group is preferably 0.7 to 1.2 and more preferably 0.8 to 1.2 because a polyimide resin having high molecular weight is easily obtained and such a polyimide resin provides a cured product having good mechanical properties. The ratio (ma)/(mb) is more preferably 0.9 to 1.1 because a polyimide resin having high storage stability is easily obtained. In the case where other carboxylic acid anhydrides are used together with cyclohexanetricarboxylic acid anhydride, the (mb) is the total number of moles of the acid anhydride group and carboxyl group in all the carboxylic acid anhydrides.

When the production is performed through a single stage reaction in the production method 1, for example, a polyisocyanate compound and a compound having an acid anhydride group are prepared in a reactor, and the reaction is caused to proceed while performing decarboxylation by increasing the temperature under stirring.

The reaction can be caused to proceed at a temperature of 50 to 250° C. The reaction temperature is preferably 70 to 180° C. in terms of reaction rate and prevention of a side reaction.

The reaction is preferably caused to proceed until the reaction of the isocyanate group is substantially completed because the stability of the polyimide resin obtained is improved. An alcohol or a phenol compound may be added to cause a reaction with the slightly remaining isocyanate group.

When the polyimide resin (A) used in the present invention is produced, an organic solvent is preferably used to achieve a homogeneous reaction. Such an organic solvent may be added in a system before the reaction proceeds or may be added during the reaction. To maintain a proper reaction rate, the ratio of the organic solvent in the reaction system is preferably 98% or less by mass, more preferably 10 to 90% by mass, and further preferably 40 to 90% by mass. Since a compound having an isocyanate group is used as a raw material component, such an organic solvent is preferably a polar aprotic organic solvent that does not contain an active proton of a hydroxyl group, an amino group, or the like.

Examples of the polar aprotic organic solvent include polar organic solvents such as dimethylformamide, dimethylacetamide, N-methyl-2-pyrrolidone, dimethyl sulfoxide, sulfolane, and γ-butyrolactone. In addition to the above-described solvents, ether solvents, ester solvents, ketone solvents, and petroleum solvents may be used as long as the polyimide resin is soluble therein. Various solvents may be used in combination.

In particular, γ-butyrolactone is preferably used in consideration of the odor and toxicity of a solvent, the reduction in the amount of remaining solvent when a film is dried and cured, and the reduction in the amount of moisture absorbed by a solvent in a film. The polyimide resin obtained also preferably has a structure that is soluble in γ-butyrolactone. A polyimide resin that is soluble in γ-butyrolactone and has high performance in various properties (heat-resisting property, low coefficient of linear expansion, and mechanical properties) can be obtained by using an isocyanate component containing at least one of 4,4'-diphenylmethane diisocyanate, tolylene diisocyanate, and 4,4'-diisocyanate-3,3'-dimethyl-1,1'-biphenyl and by causing cyclohexane-1,3,4-tricarboxylic acid-3,4-anhydride to react with trimellitic anhydride. The ratios of the diisocyanate component, cyclohexane-1,3,4-tricarboxylic acid-3,4-anhydride, and trimellitic anhydride used are preferably 10 to 60 mol %, 2 to 60 mol %, and 2 to 60 mol %, respectively, relative to the total molar quantity of all raw materials constituting the polyimide resin. Furthermore, benzophenonetetracarboxylic acid anhydride is preferably used as an acid component to provide a cured product having better mechanical properties. The amount of benzophenonetetracarboxylic acid anhydride is preferably 2 to 20 mol % relative to the total molar quantity of all raw materials constituting the polyimide resin.

Examples of the ether solvents that can be used in the method for producing the polyimide resin used in the present invention include ethylene glycol dialkyl ethers such as ethylene glycol dimethyl ether, ethylene glycol diethyl ether, and ethylene glycol dibutyl ether; polyethylene glycol dialkyl ethers such as diethylene glycol dimethyl ether, diethylene glycol diethyl ether, diethylene glycol dibutyl ether, triethylene glycol dimethyl ether, triethylene glycol diethyl ether, and triethylene glycol dibutyl ether; ethylene glycol monoalkyl ether acetates such as ethylene glycol monomethyl ether acetate, ethylene glycol monoethyl ether acetate, and ethylene glycol monobutyl ether acetate; polyethylene glycol monoalkyl ether acetates such as diethylene glycol monomethyl ether acetate, diethylene glycol monoethyl ether acetate, diethylene glycol monobutyl ether acetate, triethylene glycol monomethyl ether acetate, triethylene glycol monoethyl ether acetate, and triethylene glycol monobutyl ether acetate;

propylene glycol dialkyl ethers such as propylene glycol dimethyl ether, propylene glycol diethyl ether, and propylene glycol dibutyl ether; polypropylene glycol dialkyl ethers such as dipropylene glycol dimethyl ether, dipropylene glycol diethyl ether, dipropylene glycol dibutyl ether, tripropylene glycol dimethyl ether, tripropylene glycol diethyl ether, and tripropylene glycol dibutyl ether; propylene glycol monoalkyl ether acetates such as propylene glycol monomethyl ether acetate, propylene glycol monoethyl ether acetate, and propylene glycol monobutyl ether acetate; polypropylene glycol monoalkyl ether acetates such as dipropylene glycol monomethyl ether acetate, dipropylene glycol monoethyl ether acetate, dipropylene glycol monobutyl ether acetate, tripropylene glycol monomethyl ether acetate, tripropylene glycol monoethyl ether acetate, and tripropylene glycol monobutyl ether acetate; dialkyl ethers of copolymerized polyether glycol such as low-molecular-weight ethylene-propylene copolymers; monoacetate monoalkyl ethers of copolymerized polyether glycol; alkyl esters of copolymerized polyether glycol; and monoalkyl ester monoalkyl ether of copolymerized polyether glycol.

Examples of the ester solvents include ethyl acetate and butyl acetate. Examples of the ketone solvents include acetone, methyl ethyl ketone, and cyclohexanone. Examples of the petroleum solvents include aromatic solvents having high boiling point such as toluene and xylene; and aliphatic and alicyclic solvents such as hexane and cyclohexane.

When the polyimide resin (A) used in the present invention is synthesized by an amine method, the synthesis can be performed by using a diamine compound obtained by substituting the isocyanate group of the isocyanate component used in the above-described isocyanate method with an amine group.

The cyclohexanetetracarboxylic acid dianhydride is caused to react with diamine, for example, by adding cyclohexanetetracarboxylic acid dianhydride to an organic solvent containing diamine, retaining the temperature at 4 to 30° C. to obtain a polyamic acid solution, and adding an imidization catalyst and distilling produced water to the outside of the system to perform dehydrating imidization.

The above-described organic solvent is exemplified as an organic solvent used when an imide resin is synthesized from the diamine and acid anhydride.

A tertiary amine such as triethylamine, n-tripropylamine, n-tributylamine, pyridine, or β-picoline or an acid such as phenol or benzoic acid can be used as the imidization catalyst, and a tertiary amine is preferably used. The proper molar ratio (imidization catalyst/diamine) of the imidization catalyst to diamine is preferably 0.01 to 1.0 and particularly preferably 0.05 to 0.1.

The molar ratio (diamine/cyclohexanetetracarboxylic acid dianhydride) of diamine to cyclohexanetetracarboxylic acid dianhydride is preferably 0.95 to 1.05 and particularly preferably 0.99 to 1.01.

In the dehydrating imidization in the production method 2, distillate mainly composed of water is removed to the outside of the reaction system using a vapor cooling tower attached to the upper portion of a reactor and a distillate storage device engaged with the vapor cooling tower. The reaction temperature is normally 160 to 200° C., preferably 170 to 190° C., and more preferably 180 to 190° C. If the reaction temperature is less than 160° C., imidization and polymerization sometimes do not sufficiently proceed due to low temperature. If the reaction temperature is more than 200° C., a problem in that a resin burns on the wall surface of the reactor may be caused when the viscosity of the solution is significantly increased. In particular cases, an azeotropic dehydrating agent such as toluene or xylene may be used. The reaction is normally performed at atmospheric pressure, but may be optionally performed at increased pressure. The reaction temperature needs to be retained for at least 1 hour and is preferably retained for 3 hours or longer and 10 hours or shorter. If the retention time of the reaction temperature is shorter than 1 hour, imidization and polymerization sometimes do not sufficiently proceed. Even if the retention time of the reaction temperature is longer than 10 hours, the proceeding of imidization and polymerization is not recognized. The degree of polymerization of the polyimide resin (A) can be relatively evaluated by measuring logarithmic viscosity. The logarithmic viscosity is a value obtained by dissolving the polyimide resin (A) in N-methyl-2-pyrrolidone in a concentration of 0.5 g/dL and performing measurement at 30° C. If the logarithmic viscosity is less than 0.4 dL/g, the degree of polymerization is not sufficiently high and thus it is difficult to obtain a free standing film. The logarithmic viscosity is preferably 0.8 dL/g or more.

The polyimide resin having the structure represented by the general formula (a1-3) can be obtained by amidation and imidization caused through a reaction between trimellitic anhydride and 4,4'-diaminodiphenylmethane in the amic acid method. In the isocyanate method, the polyimide resin can be obtained by imidization between trimellitic anhydride and methylenebis(phenyl isocyanate). The polyimide resin having the structure represented by the general formula (a1-5) can be obtained by amidation and imidization caused through a reaction between trimellitic anhydride and alkyl-substituted biphenyldiamine in the amic acid method. In the isocyanate method, the polyimide resin can be obtained by imidization between trimellitic anhydride and alkyl-substituted biphenyl diisocyanate.

The polyimide resin having the structure represented by the general formula (a1-4) can be obtained by amidation and imidization caused through a reaction between trimellitic anhydride and tolylenediamine in the amic acid method. In the isocyanate method, the polyimide resin can be obtained by imidization between trimellitic anhydride and tolylene diisocyanate.

The polyimide resin having the structure represented by the general formula (a2) or (a2-1) can be obtained by amidation caused through a reaction between cyclohexyltricarboxylic acid anhydride and various diamine compounds and then by imidization in the amic acid method. In the isocyanate method, the polyimide resin can be obtained by imidization between cyclohexyltricarboxylic acid anhydride and various diisocyanate compounds.

The polyimide resin having the structure represented by the general formula (a2-2) can be obtained by amidation and imidization caused through a reaction between cyclohexyltricarboxylic acid anhydride and 4,4'-diaminodiphenylmethane in the amic acid method. In the isocyanate method, the polyimide resin can be obtained by imidization between trimellitic anhydride and methylenebis(phenyl isocyanate).

The polyimide resin having the structure represented by the general formula (a2-3) can be obtained by amidation and imidization caused through a reaction between cyclohexyltricarboxylic acid anhydride and tolylenediamine in the amic acid method. In the isocyanate method, the polyimide resin can be obtained by imidization between trimellitic anhydride and tolylene diisocyanate.

The polyimide resin having the structure represented by the general formula (a2-4) can be obtained by amidation and imidization caused through a reaction between cyclohexyltricarboxylic acid anhydride and alkyl-substituted biphenyldiamine in the amic acid method. In the isocyanate method, the polyimide resin can be obtained by imidization between trimellitic anhydride and alkyl-substituted biphenyl diisocyanate.

The polyimide resin having the structure represented by the general formula (a4) or (a4-1) can be obtained by amidation caused through a reaction between benzophenonetetracarboxylic acid anhydride and various diamine compounds and then by imidization in the amic acid method. In the isocyanate method, the polyimide resin can be obtained by imidization between benzophenonetetracarboxylic acid anhydride and various diisocyanate compounds.

The polyimide resin having the structure represented by the general formula (a4-2) can be obtained by amidation and imidization caused through a reaction between benzophenonetetracarboxylic acid anhydride and 4,4'-diaminodiphenylmethane in the amic acid method. In the isocyanate method, the polyimide resin can be obtained by imidization between benzophenonetetracarboxylic acid anhydride and methylenebis(phenyl isocyanate).

The polyimide resin having the structure represented by the general formula (a4-3) can be obtained by amidation and imidization caused through a reaction between benzophenonetetracarboxylic acid anhydride and tolylenediamine in the amic acid method. In the isocyanate method, the polyimide resin can be obtained by imidization between trimellitic anhydride and tolylene diisocyanate.

The polyimide resin having the structure represented by the general formula (a4-4) can be obtained by amidation and imidization caused through a reaction between benzophenonetetracarboxylic acid anhydride and alkyl-substituted biphenyldiamine in the amic acid method. In the isocyanate method, the polyimide resin can be obtained by imidization between trimellitic anhydride and alkyl-substituted biphenyl diisocyanate.

The polyimide resin (A) used in the present invention preferably has a cycloaliphatic hydrocarbon structure such as the structure represented by the general formula (a2-1) because the solubility is further improved and the compatibility with various solvents, a boron compound (B), which is a constituent component of the present invention, and other components is improved. By incorporating such a structure, there is provided a polyimide-containing thermosetting resin composition having high storage stability and high solubility in a solvent even after long-term storage. The polyimide resin having a cycloaliphatic hydrocarbon structure and used in the present invention is particularly preferably a polyimide resin having an imide five-membered ring structure directly connected to a cycloaliphatic hydrocarbon structure because such a polyimide resin has high storage stability and high solubility in a solvent even after long-term storage and also provides a cured product having good mechanical properties such as toughness.

An example of the polyimide resin having the imide five-membered ring structure directly connected to a cycloaliphatic hydrocarbon structure is a polyimide resin having a structure below, instead of the structure represented by the general formula (a2-1).

[Chem. 20]

(a5-1)

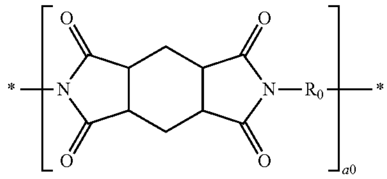

[Chem. 21]

(a5-2)

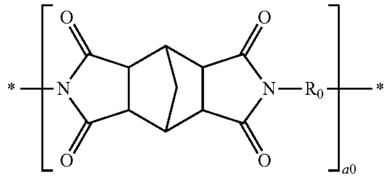

In the general formulae (a5-1) and (a5-2), $R_0$'s each independently represent a divalent diamine or a residue obtained by removing an amine group and an isocyanate group from diisocyanate, and a0 indicates a repetition and is 1 to 10000.

An example of the polyimide resin having the imide five-membered ring structure directly connected to a cycloaliphatic hydrocarbon structure is a polyimide resin in which R0 in the structure represented by the general formula (a1-2), (a2-1), (a4-1), (a5-1), or (a5-2) represents a cycloaliphatic hydrocarbon structure.

Among the polyimide resins having the imide five-membered ring structure directly connected to a cycloaliphatic hydrocarbon structure, a polyimide resin having a structure represented by the general formula (a2-1) is preferably used because such a polyimide resin has high solubility in a solvent and provides a film having good mechanical properties such as tensile strength and elongation.

The content of the structure represented by the general formula (a2-1) in the polyimide resin having the structure represented by the general formula (a2-1) is preferably 1 to 90% by mass based on the solid content of the polyimide resin to provide a polyimide resin having high solubility in a solvent and a cured product having high heat resistance, good mechanical properties such as tensile strength and elongation, and high dimensional stability. The content is more preferably 2 to 70% by mass. The content is more preferably 2 to 50% by mass and further preferably 3 to 40% by mass to decrease the crystallinity in the thermosetting resin composition of the present invention and to improve the storage stability of the thermosetting resin composition of the present invention.

A boron compound (B) used in the present invention is at least one boron compound selected from the group consisting of compounds represented by general formulae (b1) to (b3) below. By selecting a boron compound having such a structure, a cured product having high dimensional stability, high flame retardancy, and high resistance to pyrolysis, high dimensional stability, and good mechanical properties at high temperature can be obtained. The inventors of the present invention believe that the reason why a cured product having such characteristics is obtained is that an imide moiety or an amide moiety forms a complex with a boron moiety.

[Chem. 22]

(b1)

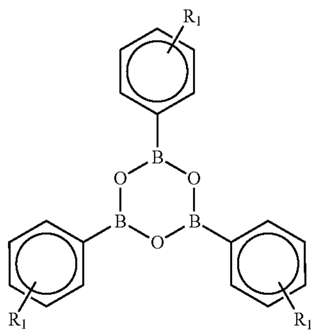

(In the formula, $R_1$'s each independently represent a hydrogen atom, an alkyl group having 1 to 4 carbon atoms, or an alkoxy group having 1 to 4 carbon atoms.)

[Chem. 23]

(b2)

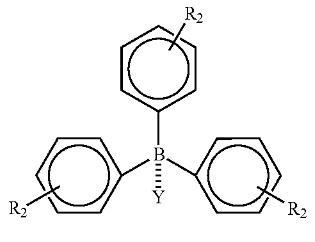

(In the formula, $R_2$'s each independently represent hydrogen, an alkyl group having 1 to 4 carbon atoms, or an alkoxy group having 1 to 4 carbon atoms; and Y represents a nitrogen-containing heterocyclic compound.)

[Chem. 24]

(b3)

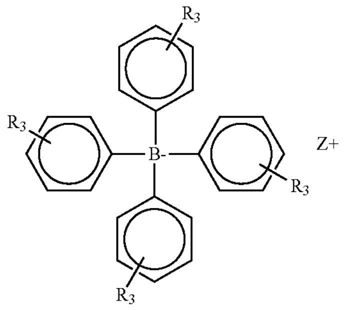

(In the formula, $R_3$'s each independently represent a hydrogen atom, an alkyl group having 1 to 4 carbon atoms, or an alkoxy group having 1 to 4 carbon atoms; and Z represents a nitrogen-containing heterocyclic compound.)

Examples of the nitrogen-containing heterocyclic compound include pyridine, pyrrole, various imidazole compounds such as imidazole, pyrazole, oxazole, isoxazole, thiazole, isothiazole, pyridazine, pyrazine, piperazine, morpholine, and pyrimidine.

In the compound represented by the general formula (b2), Y preferably represents pyridine. In the compound represented by general formula (b3), (Z) preferably represents an imidazolium salt.

A cyclic boron compound in which R1 represents a hydrogen atom, a methyl group, an ethyl group, or the like is exemplified as the compound represented by the general formula (b1). Examples of the cyclic boron compound include tris(phenylboronic acid)anhydride or tris(methylphenylboronic acid)anhydride.

Examples of the compound represented by the general formula (b2) include pyridine salts of triphenylboron, pyridine salts of tri(monomethylphenyl)boron, and pyrazole salts of triphenylboron.

Examples of the compound represented by the general formula (b3) include 2-ethyl-4-methylimidazole salts of tetraphenylboron, which serve as imidazole salts of tetraphenylboron, and 2-ethyl-4-methylimidazole salts of tetramethylphenylboron.

Among the boron compounds (B), the boron compounds represented by the general formulae (b2) and (b3) are preferably used because a resin composition having high solubility is obtained and a cured product having good mechanical properties is obtained. Among the boron compounds represented by the general formula (b2), pyridine salts of triphenylboron are more preferably used. Among the boron compounds represented by the general formula (b3), 2-ethyl-4-methylimidazole salts of tetraphenylboron are further preferably used.

The composition ratio of the boron compound (B) to the polyimide resin (A) is preferably 0.5 to 30 parts by mass, more preferably 0.5 to 20 parts by mass, and further preferably 1 to 15 parts by mass relative to 100 parts by mass of the polyimide resin (A) in total on a solid content basis.

The thermosetting resin composition of the present invention may be prepared by, for example, simply mixing the polyimide resin (A) with the boron compound (B) or may be prepared by mixing the polyimide resin (A) and the boron compound (B) with each other and then dissolving the boron compound (B) by heating. In the thermosetting resin composition of the present invention, the boron compound (B) is preferably in a dissolved state. To dissolve the boron compound (B), for example, the polyimide resin (A) and boric acid and/or the boron compound (B) are mixed with each other and then stirring may be performed for 1 to 60 minutes at 50 to 200° C. and preferably 80 to 180° C.

In the thermosetting resin composition of the present invention, a boron compound such as boric acid and/or boric acid ester may be used in combination with the boron compound (B). Examples of such a boron compound include boric acid; linear aliphatic boric acid esters, e.g., boric acid trialkyl esters such as trimethyl borate, triethyl borate, tributyl borate, tri-n-octyl borate, tri(triethylene glycol methyl ether) boric acid ester, tricyclohexyl borate, and trimenthyl borate; aromatic boric acid esters such as tri-o-cresyl borate, tri-m-cresyl borate, tri-p-cresyl borate, and triphenyl borate; boric acid esters containing two or more boron atoms and having a cyclic structure, such as tri(1,3-butanediol) biborate, tri(2-methyl-2,4-pentanediol) biborate, and tri(octylene glycol) diborate; polyvinyl alcohol boric acid esters; and hexylene glycol boric anhydrides.

In the case where a compound other than the boron compound (B) is added to the thermosetting resin composition of the present invention, boric acid and linear aliphatic boric acid esters are preferably used because a thermosetting resin composition having high storage stability is obtained and a cured film having high dimensional stability is obtained. Among the linear aliphatic boric acid esters, boric acid trialkyl esters having 4 to 20 carbon atoms are preferred, and tributyl borate (boric acid tributyl ester) is particularly preferred.

Other thermosetting resin components can be further added to the thermosetting resin composition of the present invention. Examples of the other thermosetting resin components include an epoxy resin (D), an isocyanate compound, silicate, an alkoxysilane compound, and a melamine resin.

The epoxy resin preferably has two or more epoxy groups in its molecule. Examples of the epoxy resin include bisphenol epoxy resins such as bisphenol A epoxy resin, bisphenol S epoxy resin, and bisphenol F epoxy resin; novolac epoxy resins such as phenol novolac epoxy resin, cresol novolac epoxy resin, and bisphenol novolac; epoxidized products of various dicyclopentadiene-modified phenol resins obtained by causing a reaction between dicyclopentadiene and various phenols; biphenyl epoxy resins such as epoxidized products of 2,2',6,6'-tetramethylbiphenol; epoxy resins having a naphthalene skeleton; aromatic epoxy resins such as epoxy resins having a fluorene skeleton and hydrogenated products of such aromatic epoxy resins; aliphatic epoxy resins such as neopentyl glycol diglycidyl ether and 1,6-hexanediol diglycidyl ether; alicyclic epoxy resins such as 3,4-epoxycyclohexylmethyl-3,4-epoxycyclohexanecarboxylate and bis(3,4-epoxycyclohexyl)adipate; and heterocyclic epoxy resins such as triglycidyl isocyanurate. Aromatic epoxy resins are preferably used because a thermosetting polyimide resin composition that provides a cured film having good mechanical properties is obtained. Among the aromatic epoxy resins, novolac epoxy resins are more preferably used.

The mixing ratio ((A)/(D)) of the polyimide resin (A) used in the present invention to the epoxy resin (D) is 1/50 to 50/1 and preferably 1/10 to 10/1 on a mass basis of the resins.

Examples of the isocyanate compound include aromatic isocyanate compounds, aliphatic isocyanate compounds, and alicyclic isocyanate compounds. A polyisocyanate compound having two or more isocyanate groups in its molecule is preferred. A blocked isocyanate compound can also be used.

Examples of the alkoxysilane include alkyltrialkoxysilane and dialkyldialkoxysilane.

Examples of the alkyltrialkoxysilane include methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, phenyltrimethoxysilane, phenyltriethoxysilane, phenyltripropoxysilane, and phenyltributoxysilane.

Examples of the dialkyldialkoxysilane include dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, diphenyldimethoxysilane, diphenyldiethoxysilane, diphenyldipropoxysilane, diphenyldibutoxysilane, methylethyldimethoxysilane, methylethyldiethoxysilane, methylethyldipropoxysilane, methylethyldibutoxysilane, methylphenyldimethoxysilane, methylphenyldiethoxysilane, methylphenyldipropoxysilane, methylphenyldibutoxysilane, trimethylmethoxysilane, trimethylethoxysilane, triethylmethoxysilane, triethylethoxysilane, triphenylmethoxysilane, and triphenylethoxysilane.

A condensate of alkylalkoxysilane can also be used. Examples of the condensate include condensates of the alkyltrialkoxysilane and condensates of the dialkyldialkoxysilane.

An example of the melamine resin is an alkoxylated melamine resin obtained through a reaction between an alcohol compound and the entire or part of a methylol compound which is obtained through a reaction between formaldehyde and a triazine ring-containing amino compound such as melamine or benzoguanamine. The alcohol compound used herein is, for example, a lower alcohol having about 1 to 4 carbon atoms. Specifically, a methoxymethylol melamine resin, a butylated methylol melamine resin, or the like can be used. Regarding the molecular structure, the melamine resin may be completely alkoxylated, the methylol group may be left, and the imino group may be left.

In the thermosetting resin composition of the present invention, this alkoxylated melamine resin functions as a crosslinking component to improve the heat resistance and physical properties, and furthermore prevents added boric acid and/or boric acid ester from precipitating over time and thus improves the stability of the thermosetting resin composition.

Regarding the resin structure of the alkoxylated melamine resin, a methoxymethylol melamine resin is preferred because the compatibility with the polyimide resin and the curing property are improved. A methoxymethylol melamine resin with a methoxylation ratio of 80% or more is further preferred.

The resin structure may be a polynuclear structure formed through self-condensation. In consideration of compatibility and stability, the degree of polymerization is preferably about 1 to 5 and more preferably about 1.2 to 3.

An alkoxylated melamine resin having a number-average molecular weight of 100 to 10000 can be used. The number-average molecular weight is preferably 300 to 2000 in terms of the compatibility with the polyimide resin and the curing property, and more preferably 400 to 1000.

The alkoxylated melamine resin may be obtained by simultaneously adding melamine or benzoguanamine, formalin, and an alcohol and then causing a reaction, or may be obtained by causing melamine or benzoguanamine and formalin to react with each other in advance to obtain a methylol melamine compound and then performing alkoxylation with an alcohol compound.

Examples of commercially available alkoxylated melamine resin include methoxymethylol melamine resins, which are specifically CYMEL 300, 301, 303, and 305 manufactured by Nihon Cytec Industries, Inc. Examples of a methoxymethylol melamine resin having a methylol group include CYMEL 370 and 771 manufactured by Nihon Cytec Industries, Inc. Examples of a methoxylated melamine resin having an imino group include CYMEL 325, 327, 701, 703, and 712 manufactured by Mitsui Cytec Ltd. Examples of methoxylated/butoxylated melamine resin include CYMEL 232, 235, 236, 238, 266, 267, and 285 manufactured by Nihon Cytec Industries, Inc. An example of butoxylated melamine resin is U-VAN 20SE60 manufactured by Nihon Cytec Industries, Inc.

To achieve good mechanical properties and high TG, the amount of the alkoxylated melamine resin used is 1 to 80 parts by mass, preferably 1 to 50 parts by mass, and more preferably 1 to 30 parts by mass relative to 100 parts by mass of the polyimide resin (A) and the boron compound (B) in total.

The thermosetting resin composition of the present invention may contain binder resins such as polyester, phenoxy resin, PPS resin, PPE resin, and polyarylene resin; curing agents or reactive agents such as phenol resin, melamine resin, an alkoxysilane curing agent, a polybasic acid anhydride, and a cyanate compound; curing catalysts and curing accelerators such as melamine, dicyandiamide, guanamine, the derivatives thereof, imidazoles, amines, phenols having a hydroxyl group, organic phosphines, phosphonium salts, quaternary ammonium salts, and photo cationic catalysts; fillers; and other additives such as an antifoaming agent, a leveling agent, a slipping agent, a wettability improving agent, an anti-settling agent, a flame retardant, an antioxidant, and an ultraviolet absorber.

The thermosetting resin composition of the present invention may further optionally contain various fillers, organic pigments, inorganic pigments, extenders, and anticorrosives. They may be used alone or in combination.

Examples of the fillers include barium sulfate, barium titanate, silicon oxide powder, particulate silicon oxide, silica, talc, clay, magnesium carbonate, calcium carbonate, aluminum oxide, aluminum hydroxide, mica, and alumina.

Fillers having various particle sizes can be used in an amount that does not impair the physical properties of the resins and composition. The proper amount is about 5 to 80% by mass, and the fillers are preferably used after being uniformly dispersed. The dispersion can be performed with a publicly known roll or a bead mill or by high-speed dispersion, and the surfaces of the particles may be modified in advance with a dispersing agent.

Examples of the organic pigments include azo pigments; copper phthalocyanine pigments such as phthalocyanine blue and phthalocyanine green; and quinacridone pigments.

Examples of the inorganic pigments include chromic acid salts such as chrome yellow, zinc chromate, and molybdate orange; ferrocyanides such as Prussian blue; titanium oxide, zinc white, iron red, and iron oxide; metal oxides such as chromium carbide green; cadmium yellow and cadmium red; metal sulfides such as mercury sulfide; selenides; sulfates such as lead sulfate; silicates such as ultramarine blue; carbonates and cobalt violet; phosphates such as manganese violet; metal powders such as aluminum powder, zinc powder, brass powder, magnesium powder, iron powder, copper powder, and nickel powder; and carbon black.

Any of other coloring pigments, anticorrosive pigments, and extenders can also be used. They may be used alone or in combination.

The thermosetting resin composition of the present invention can be dried or cured by heating at 100 to 300° C. after being coated or molded.

A substrate used in the method for forming a film is not particularly limited. The substrate is composed of, for example, plastic, metal, wood, glass, an inorganic material, or a composite material of the foregoing.

The thermosetting resin composition of the present invention can be used in the form of a film (adhesive film) including a resin, a composition layer (A layer) of the resin, and a supporting film (B layer), which is a suitable form for producing a flexible circuit board.

An adhesive film can be produced by various methods. For example, a resin varnish is prepared by dissolving the thermosetting resin composition of the present invention in an organic solvent. The resin varnish is applied onto a supporting film, and the organic solvent is dried by heating, hot air blasting, or the like to form a resin composition layer. Thus, an adhesive film is produced.

The supporting film (B layer) is a support used when the adhesive film is produced. In the production of a flexible circuit board, the supporting film is detached or removed in the end. Examples of the supporting film include films made of polyethylene, polyolefin such as polyvinyl chloride, polyester such as polyethylene terephthalate (hereinafter, may be referred to as "PET") or polyethylene naphthalate, or polycarbonate; release paper; and metal foil such as copper foil. When copper foil is used as the supporting film, the copper foil can be removed by performing etching with an etchant composed of ferric chloride, cupric chloride, or the like. The supporting film may be subjected to a mat treatment, a corona treatment, or a release treatment. In consideration of releasing property, the supporting film is preferably subjected to a release treatment. The thickness of the supporting film is not particularly limited, and is normally 10 to 150 μm and preferably 25 to 50 μm.

Examples of the organic solvent used for preparing the varnish include ketones such as acetone, methyl ethyl ketone, and cyclohexanone; acetic esters such as ethyl acetate, butyl acetate, cellosolve acetate, propylene glycol monomethyl ether acetate, and carbitol acetate; carbitols such as cellosolve and butyl carbitol; aromatic hydrocarbons such as toluene and xylene; and dimethylformamide, dimethylacetamide, N-methylpyrrolidone, and gamma-butyrolactone. These organic solvents may be used in combination.

The drying conditions are not particularly limited, but the drying is performed so that the content of the organic solvent in the resin composition is normally 5% or less by mass and preferably 3% or less by mass. Specific drying conditions are dependent on the curing property of the resin composition and the amount of the organic solvent in the varnish. For example, a varnish containing 30 to 60% by mass of the organic solvent can be normally dried at 80 to 120° C. for about 3 to 13 minutes. A person skilled in the art can set suitable drying conditions by performing a simple experiment.

The thickness of the resin composition layer (A layer) is normally 5 to 500 μm. The preferable range of the thickness of the A layer is dependent on the applications of the adhesive film. In the case where the adhesive film is used to produce a multi-layer flexible circuit board by a build-up process, since the thickness of a conductive layer that constitutes a circuit is normally 5 to 70 μm, the thickness of the A layer that corresponds to an interlayer insulating layer is preferably 10 to 100 μm.

The A layer may be protected with a protective film. By protecting the A layer with a protective film, the adhesion of dust to the surface of the resin composition layer and scratches on the surface can be prevented. The protective film is detached during lamination. The protective film can be composed of the same material as that of the supporting film. The thickness of the protective film is not particularly limited, and is preferably 1 to 40 μm.

The adhesive film produced using the thermosetting resin composition of the present invention can be particularly suitably used to produce a multi-layer flexible circuit board. Hereinafter, a method for producing a multi-layer flexible circuit board will be described. The adhesive film produced using the thermosetting resin composition of the present invention can be suitably laminated onto a flexible circuit board with a vacuum laminator. The flexible circuit board used herein can be mainly used for a conductive layer (circuit) obtained by patterning a single side or both sides of a substrate such as a polyester substrate, a polyimide substrate, a polyamide-imide substrate, or a liquid crystal polymer substrate. Furthermore, the flexible circuit board can be used to further perform multi-layering of a multi-layer flexible circuit board in which circuits and insulating layers are alternately formed and the circuits are formed on a single side or both sides. In terms of the adhesion of the insulating layer to the circuit board, the circuit surface is preferably roughened in advance using hydrogen peroxide/sulfuric acid or a surface-treating agent such as MEC etch BOND (manufactured by MEC COMPANY LTD.).

Examples of a commercially available vacuum laminator include Vacuum Applicator manufactured by Nichigo-Morton Co., Ltd., Vacuum & pressure laminator manufactured by MEIKI Co., Ltd., Roll-type Dry Coater manufactured by Hitachi Techno Engineering Co., Ltd., and Vacuum Laminator manufactured by Hitachi AIC Inc.

In the lamination, when the adhesive film includes a protective film, the protective film is detached and then the adhesive film is press-bonded onto the circuit board while the adhesive film is pressurized and heated. The adhesive film and the circuit board are optionally preheated, and then the lamination is preferably performed at a press-bonding temperature of preferably 70 to 140° C. at a press-bonding pressure of preferably 1 to 11 $kgf/cm^2$ under a reduced air pressure of 20 mmHg or less. The lamination may be performed by a batch process or a continuous process using a roll.

After the adhesive film is laminated onto the circuit board, the temperature is decreased to about room temperature and then the supporting film is detached. Subsequently, a thermosetting resin composition laminated onto the circuit board is cured by heating. The heating and curing conditions are normally selected from 150 to 220° C. and 20 to 180 minutes, and are preferably selected from 160 to 200° C. and 30 to 120 minutes. When the supporting film is subjected to a release treatment or includes a detachment layer composed of silicon or the like, the supporting film can be detached after the thermosetting resin composition is cured by heating or after the thermosetting resin composition is cured by heating and holes are made.

After an insulating layer, which is a cured product of the thermosetting resin composition, is formed, holes may be optionally made in the circuit board by a method that uses a drill, laser, or plasma or by a combined method thereof to form via holes or through holes. Holes are typically made by using a laser such as a carbon dioxide laser or a YAG laser.

Subsequently, the insulating layer (cured product of the thermosetting resin composition) is subjected to a surface treatment. A method used in a desmear process can be employed for the surface treatment, and thus the surface treatment can be performed together with desmearing. An oxidant is typically used as an agent for a desmear process. Examples of the oxidant include permanganates (e.g., potassium permanganate and sodium permanganate), dichromates, ozone, hydrogen peroxide/sulfuric acid, and nitric acid. The treatment is preferably performed using an alkaline permanganic acid solution (e.g., an aqueous sodium hydroxide solution of potassium permanganate and sodium permanganate), which is an oxidant commonly used to roughen an insulating layer when multi-layer printed circuit boards are produced by a build-up process. Before the treatment using an oxidant, a treatment using a swelling agent can be performed. After the treatment using an oxidant, neutralization is typically performed using a reductant.

After the surface treatment, a conductive layer is formed on the surface of the insulating layer by plating. The conductive layer can be formed by a combined method of electroless plating and electrolytic plating. Alternatively, a plating resist having a pattern opposite to that of a conductive layer is formed, and a conductive layer can be formed by performing only electroless plating. After the formation of the conductive layer, annealing can be performed at 150 to 200° C. for 20 to 90 minutes to further improve and stabilize the peel strength of the conductive layer.

Examples of the method for patterning the conductive layer to form a circuit include a subtractive method and a semi-additive method known by a person skilled in the art. In the case of the subtractive method, the thickness of an electroless copper plating layer is 0.1 to 3 μm and preferably 0.3 to 2 μm. An electroplating layer (panel plating layer) is formed thereon so as to have a thickness of 3 to 35 μm and preferably 5 to 20 μm. An etching resist is formed and then etching is performed with an etchant composed of ferric chloride, cupric chloride, or the like to form a conductive pattern. The etching resist is then removed to obtain a circuit board. In the case of the semi-additive method, an electroless copper plating layer is formed so as to have a thickness of 0.1 to 3 μm and preferably 0.3 to 2 μm. A pattern resist is formed and then removed after electrolytic copper plating to obtain a circuit board.

A film having a configuration in which the supporting film is replaced with a heat-resistant resin layer (heat-resistant resin film), that is, a film including the thermosetting composition layer (A layer) of the present invention and a heat-resistant resin layer (C layer) can be used as a base film for flexible circuit boards. A film including the thermosetting resin composition layer (A layer) of the present invention, the heat-resistant resin layer (C layer), and copper foil (D layer) can also be used as a base film for flexible circuit boards. In this case, the base film has a layer structure in which the A layer, the C layer, and the D layer are laminated in that order. In the above-described base film, the heat-resistant resin layer is not detached and constitutes a part of a flexible circuit board.

A film including an insulating layer (A' layer), which is a cured product of the thermosetting resin composition of the present invention, formed on a heat-resistant resin layer (C layer) can be used as a base film for single-sided flexible circuit boards. A film having a layer structure in which the A' layer, the C layer, and the A' layer are laminated in that order and a film having a layer structure in which the A' layer, the C layer, and copper foil (D layer) are laminated in that order can be used as a base film for double-sided flexible circuit boards.

Examples of a heat-resistant resin used for the heat-resistant resin layer include polyimide resin, aramid resin, polyamide-imide resin, and liquid crystal polymer. In particular, a polyimide resin and a polyamide-imide resin are preferred. In order to use the heat-resistant resin for flexible circuit boards, a heat-resistant resin having a breaking strength of 100 MPa or more, a breaking elongation of 5% or more, a thermal expansion coefficient of 40 ppm or less at 20 to 150° C., and a glass transition temperature of 200° C. or more or a decomposition temperature of 300° C. or more is preferably used.

A commercially available film-like heat-resistant resin can be suitably used as the heat-resistant resin that satisfies such characteristics. Examples of the heat-resistant resin include polyimide film "Upilex-S" manufactured by Ube Industries, Ltd., polyimide film "Kapton" manufactured by DU PONT-TORAY Co., Ltd., polyimide film "Apical" manufactured by KANEKA CORPORATION, "Aramica" manufactured by TEIJIN ADVANCED FILM Co., Ltd., liquid crystal polymer film "VECSTAR" manufactured by KURARAY CO., LTD., and polyetheretherketone film "SUMILITE FS-1100C" manufactured by SUMITOMO BAKELITE Co., Ltd.

The thickness of the heat-resistant resin layer is normally 2 to 150 μm and preferably 10 to 50 μm. The heat-resistant resin layer (C layer) may be surface-treated. Examples of the surface treatment include dry treatments such as a mat treatment, a corona discharge treatment, and a plasma treatment; chemical treatments such as a solvent treatment, an acid treatment, and an alkali treatment; and a sandblasting treatment and a mechanical polishing treatment. In terms of the adhesion to the A layer, a plasma treatment is particularly preferably performed.

A base film for single-sided flexible circuit boards that includes the insulating layer (A') and the heat-resistant resin layer (C) can be produced as follows. As in the above-described adhesive film, a resin varnish is prepared by dissolving the thermosetting resin composition of the present invention in an organic solvent. The resin varnish is applied onto a heat-resistant resin film, and the organic solvent is dried by heating, hot air blasting, or the like to form a thermosetting resin composition layer. The organic solvent and the drying conditions are the same as those of the adhesive film. The thickness of the resin composition layer is preferably 5 to 15 μm.

Subsequently, the thermosetting resin composition layer is dried by heating to form an insulating layer composed of the thermosetting resin composition. The heating and curing conditions are normally selected from 150 to 220° C. and 20 to 180 minutes, and are preferably selected from 160 to 200° C. and 30 to 120 minutes.

A base film for double-sided flexible circuit boards that includes the insulating layer (A' layer), the heat-resistant resin layer (C layer), and copper foil (D layer) may be produced, as described above, by forming a resin composition layer on a copper-clad laminate film including the heat-resistant resin layer (C layer) and copper foil (D layer). Examples of the copper-clad laminate film include two-layer CCLs (copper-clad laminates) by a cast method, two-layer CCLs by a sputtering method, and two-layer CCLs and three-layer CCLs by a lamination method. The thickness of the copper foil is suitably 12 μm or 18 μm.

Examples of commercially available two-layer CCLs include ESPANEX SC (manufactured by Nippon Steel Chemical Co., Ltd.), NEOFLEX I<CM> and NEOFLEX I<LM> (manufactured by Mitsui Chemicals, Inc), and S'PERFLEX (manufactured by Sumitomo Metal Mining Co., Ltd.). An example of commercially available three-layer CCLs is NIKAFLEX F-50VC1 (manufactured by NIKKAN INDUSTRIES CO., LTD.).

A base film for double-sided flexible circuit boards that includes the insulating layer (A' layer), the heat-resistant resin layer (C layer), and the insulating layer (A' layer) can be produced as follows. As in the above-described adhesive film, a resin varnish is prepared by dissolving the thermosetting resin composition of the present invention in an organic solvent. The resin varnish is applied onto a supporting film, and the organic solvent is dried by heating, hot air blasting, or the like to form a resin composition layer. The organic solvent and the drying conditions are the same as those of the adhesive film. The thickness of the resin composition layer is preferably 5 to 15 μm.

Subsequently, this adhesive film is laminated on both sides of the heat-resistant resin film. The lamination conditions are the same as those described above. If a resin composition layer is formed on one side of the heat-resistant film in advance, the lamination may be performed on only one side. The resin composition layer is cured by heating to form an insulating layer, which is a layer of the resin composition. The heating and curing conditions are normally selected from 150 to 220° C. and 20 to 180 minutes, and are preferably selected from 160 to 200° C. and 30 to 120 minutes.

A method for producing a flexible circuit board from the base film for flexible circuit boards will be described. In the case of the base film including the A' layer, the C layer, and the A' layer, curing by heating is performed and then holes are made in the circuit board by a method that uses a drill, laser, plasma, or the like to form through holes for providing electrical connection between both sides. In the case of the base film including the A' layer, the C layer, and the D layer, holes are made in the same manner to form via holes. Holes are typically made by using a laser such as a carbon dioxide laser or a YAG laser.

Subsequently, the insulating layer (layer of the resin composition) is subjected to a surface treatment. The surface treatment is performed in the same manner as in the case of the adhesive film. After the surface treatment, a conductive layer is formed on the surface of the insulating layer by plating. The formation of the conductive layer by plating is performed in the same manner as in the case of the adhesive film. After the formation of the conductive layer, annealing can be performed at 150 to 200° C. for 20 to 90 minutes to further improve and stabilize the peel strength of the conductive layer.

Subsequently, the conductive layer is patterned to form a circuit and thus a flexible circuit board is obtained. In the case where the base film including the A layer, the C layer, and the D layer is used, a circuit is also formed on the copper foil, which is the D layer. Examples of the method for forming a circuit include a subtractive method and a semi-additive method known by a person skilled in the art. The details are the same as those of the adhesive film.

By multi-layering the thus-obtained single-sided or double-sided flexible circuit board, for example, using the adhesive film of the present invention as described above, a multi-layer flexible circuit board can be produced.

The resin composition of the present invention is useful as a material for forming a stress relaxation layer between a semiconductor and a substrate. For example, as described above, the entire or part of the uppermost insulating layer on a substrate is formed of the adhesive film obtained using the resin composition of the present invention and then a semiconductor is bonded to the substrate, whereby a semiconductor device in which the semiconductor and the substrate are bonded to each other through a cured product of the resin composition can be produced. In this case, the thickness of the resin composition layer of the adhesive film is suitably selected from 10 to 1000 μm. In the resin composition of the present invention, a conductive layer can be formed by plating. Therefore, a conductive layer can also be easily formed, by plating, on an insulating layer for stress relaxation disposed on the substrate and thus a circuit pattern can be produced.

EXAMPLES

The present invention will now be specifically described based on Examples and Comparative Examples. Hereinafter, "part" and "%" are expressed on a mass basis unless otherwise specified.

Synthesis Example 1

Preparation of Polyimide Resin (A)

Into a flask equipped with a stirrer, a thermometer, and a condenser, 1422.8 g of GBL (gamma-butyrolactone), 250 g (1.0 mol) of MDI (diphenylmethane diisocyanate), 134.3 g (0.7 mol) of TMA (trimellitic anhydride), and 59.4 g (0.3 mol) of TMA-H (cyclohexane-1,3,4-tricarboxylic acid-3,4-anhydride) were inserted. The temperature was increased to 80° C. under stirring without generating heat, and the materials were dissolved and caused to react with each other at that temperature for 1 hour. The temperature was further increased to 160° C. for 2 hours, and then the reaction was caused to proceed at that temperature for 5 hours. The reaction proceeded with bubbling of carbonic acid gas and a brown clear liquid was obtained in the system. A polyimide resin (A-1) solution (a resin composition obtained by dissolving a polyimide resin in γ-butyrolactone) having a viscosity of 10 Pa·s at 25° C., a resin solid content of 20%, and an acid value of 1.8 (KOHmg/g) on a solution basis was obtained. The acid value of the resin was 1.8 (KOHmg/g). As a result of the measurement by gel permeation chromatography (GPC), the weight-average molecular weight was found to be 64000.

Figure 2:
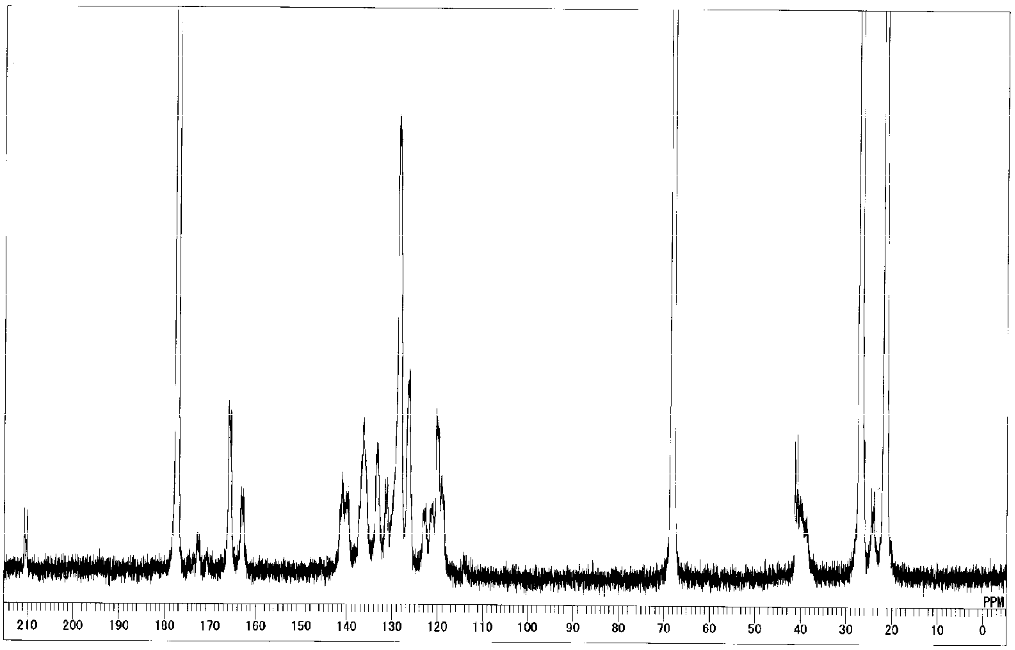
FIG. 2 is a nuclear magnetic resonance spectrum of the polyimide resin obtained in Synthesis Example 1.

The resultant polyimide resin (A-1) solution was applied onto a KBr plate and the solvent was volatilized to obtain a sample. As a result of the measurement of the infrared absorption spectrum (FIG. 1) of the sample, an absorption at 2270 cm-1, which indicates characteristic absorption of an isocyanate group, was completely lost and the characteristic absorption of an imide ring was confirmed at 725 cm-1, 1780 cm-1, and 1720 cm-1. The amount of carbonic acid gas generated was 88 g (2 mol), which was obtained by measuring a change in the mass of the materials inserted into the flask. Thus, it was concluded that 2 mol of the isocyanate group, which was the total amount of the isocyanate group, was completely converted into an imide bond and an amide bond. Furthermore, as a result of the analysis of C13-NMR (FIG. 2), a polyimide resin represented by the following structure whose composition ratio of the raw materials was MDI:TMA:TMA-H=52:35:15 on a molar basis was confirmed.

[Chem. 25]

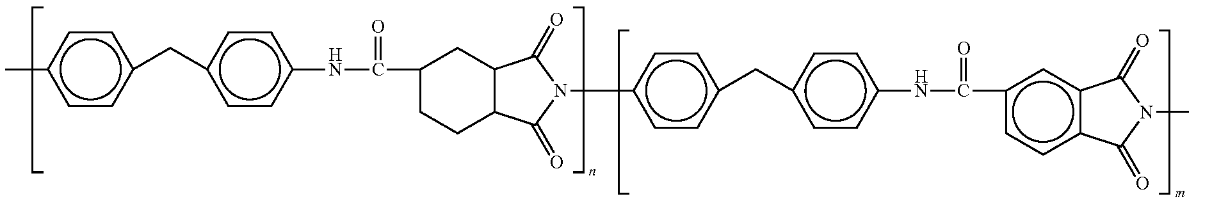

Herein, n:m=3:7.

In the structure above, the segment n had a molality of 0.843 mmol/g and the segment m had a molality of 1.967 mmol/g.

Synthesis Example 2 (as above)

Into a flask equipped with a stirrer, a thermometer, and a condenser, 1446.3 g of GBL, 240 g (0.96 mol) of MDI, 134.3 g (0.7 mol) of TMA, 39.6 g (0.2 mol) of TMA-H, and 32.2 g (0.1 mol) of BTDA (benzophenonetetracarboxylic acid anhydride) were inserted. The temperature was increased to 170° C. under stirring without generating heat for 2 hours, and the materials were caused to react with each other at that temperature for 5 hours. The reaction proceeded with bubbling of carbonic acid gas and a brown clear liquid was obtained in the system. A polyimide resin (A-2) solution (a resin composition obtained by dissolving a polyimide resin in γ-butyrolactone) having a viscosity of 8 Pa·s at 25° C., a resin solid content of 20%, and an acid value of 2.48 (KOHmg/g) on a solution basis was obtained. The acid value of the resin was 2.48 (KOHmg/g). As a result of GPC measurement, the weight-average molecular weight was found to be 52000.

Figure 3:
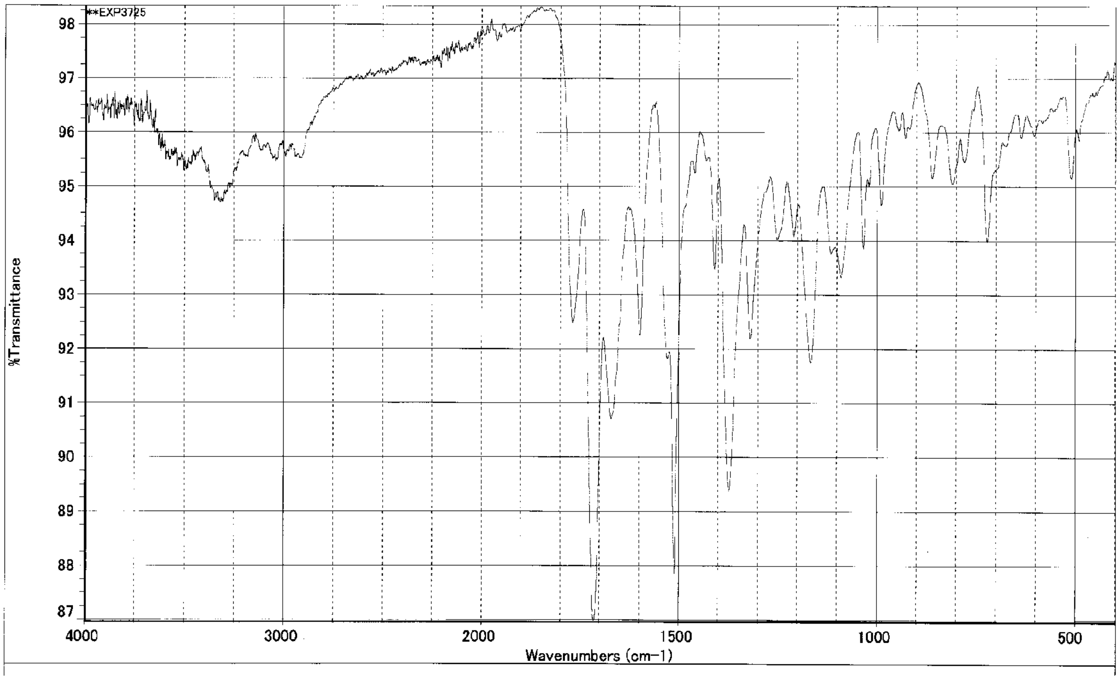
FIG. 3 is an infrared absorption spectrum of a polyimide resin obtained in Synthesis Example 2.
Figure 4:
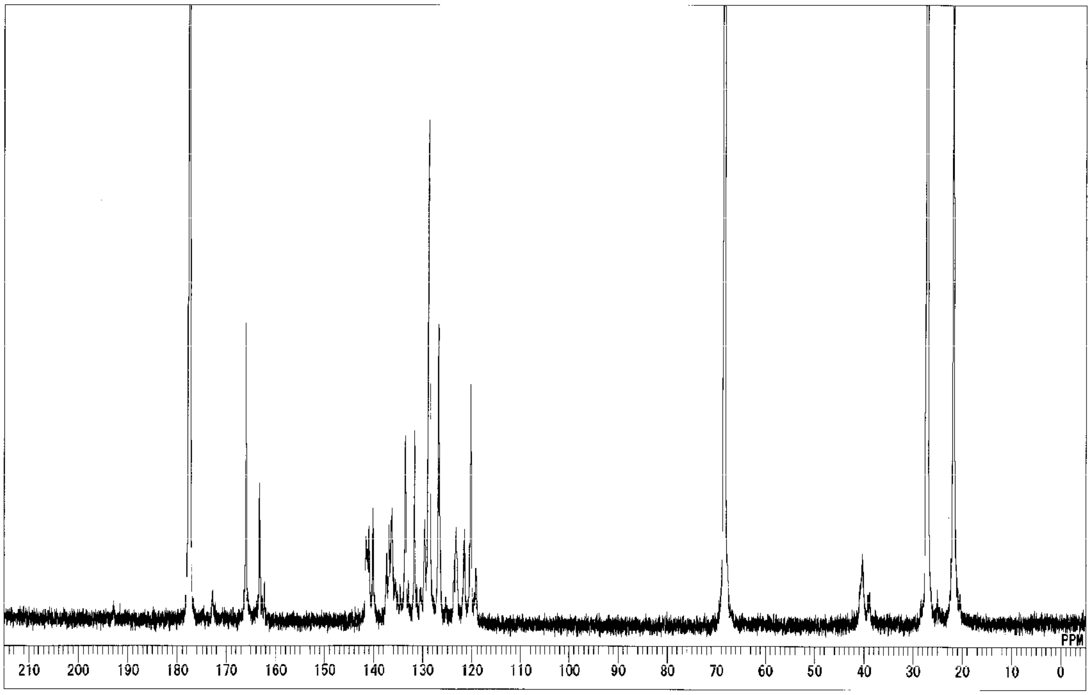
FIG. 4 is a nuclear magnetic resonance spectrum of the polyimide resin obtained in Synthesis Example 2.

The resultant polyimide resin (A-2) solution was applied onto a KBr plate and the solvent was volatilized to obtain a sample. As a result of the measurement of the infrared absorption spectrum (FIG. 3) of the sample, an absorption at 2270 cm-1, which indicates characteristic absorption of an isocyanate group, was completely lost and the characteristic absorption of an imide ring was confirmed at 725 cm-1, 1780 cm-1, and 1720 cm-1. The amount of carbonic acid gas generated was 84.5 g (1.92 mol), which was obtained by measuring a change in the mass of the materials inserted into the flask. Thus, it was concluded that the total amount of the isocyanate group was completely converted into an imide bond and an amide bond. Furthermore, as a result of the analysis of C13-NMR (FIG. 4), a polyimide resin represented by the following structure whose composition ratio of the raw materials was MDI:TMA:BTDA:TMA-H=50:35:5:10 on a molar basis was confirmed.

[Chem. 26]

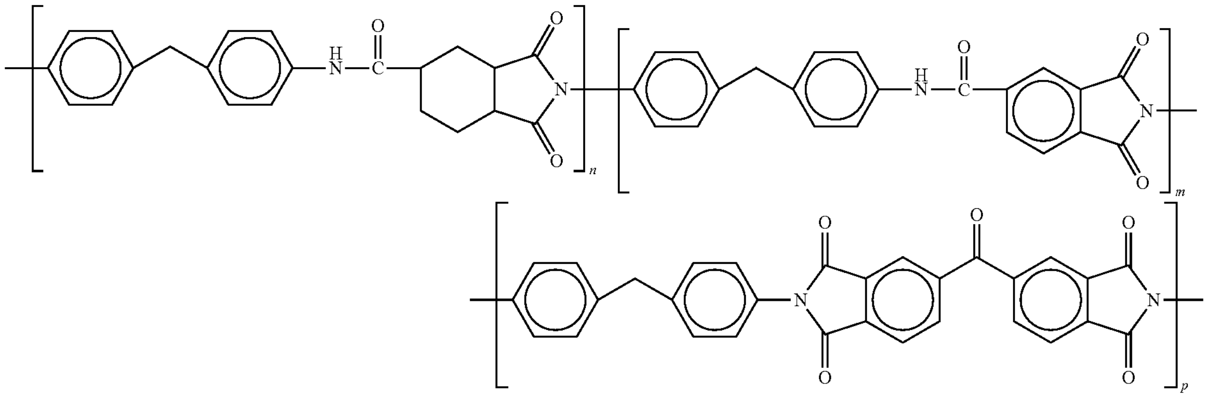

Herein, n:m:p=2:7:1.

In the structure above, the segment n had a molality of 0.531 mmol/g, the segment m had a molality of 1.859 mmol/g, and the segment p had a molality of 0.266 mmol/g.

Synthesis Example 3 (as above)

Into a flask equipped with a stirrer, a thermometer, and a condenser, 1451.2 g of GBL, 125 g (0.5 mol) of MDI, 132 g (0.5 mol) of DMBPDI (4,4'-diisocyanate-3,3'-dimethyl-1,1'-biphenyl), 134.4 g (0.7 mol) of TMA, and 59.4 g (0.3 mol) of TMA-H were inserted. The temperature was increased to 160° C. under stirring without generating heat for 2 hours, and the materials were caused to react with each other at that temperature for 5 hours. The reaction proceeded with bubbling of carbonic acid gas and a brown clear liquid was obtained in the system. The viscosity at 25° C. was 6 Pa·s (25° C.) and the resin solid content was 17%. This product is referred to as a polyimide resin (A-3) solution (a resin composition obtained by dissolving a polyimide resin in γ-butyrolactone). The acid value of the resin solution was 3.2 (KOHmg/g), and thus the average molecular weight was concluded to be 5960.

The resultant polyimide resin (A-3) solution was applied onto a KBr plate and the solvent was volatilized to obtain a sample. As a result of the measurement of the infrared absorption spectrum of the sample, an absorption at 2270 cm-1, which indicates characteristic absorption of an isocyanate group, was completely lost and the characteristic absorption of an imide ring was confirmed at 725 cm-1, 1780 cm-1, and 1720 cm-1. The amount of carbonic acid gas generated was 88 g (2 mol), which was obtained by measuring a change in the mass of the materials inserted into the flask. Thus, it was concluded that 2 mol of the isocyanate group, which was the total amount of the isocyanate group, was completely converted into an imide bond and an amide bond.

Furthermore, as a result of the analysis of C13-NMR, a polyimide resin represented by the following structure whose composition ratio of the raw materials was MDI:DMBPDI:TMA:TMA-H=25:25:35:15 on a molar basis was confirmed.

[Chem. 27]

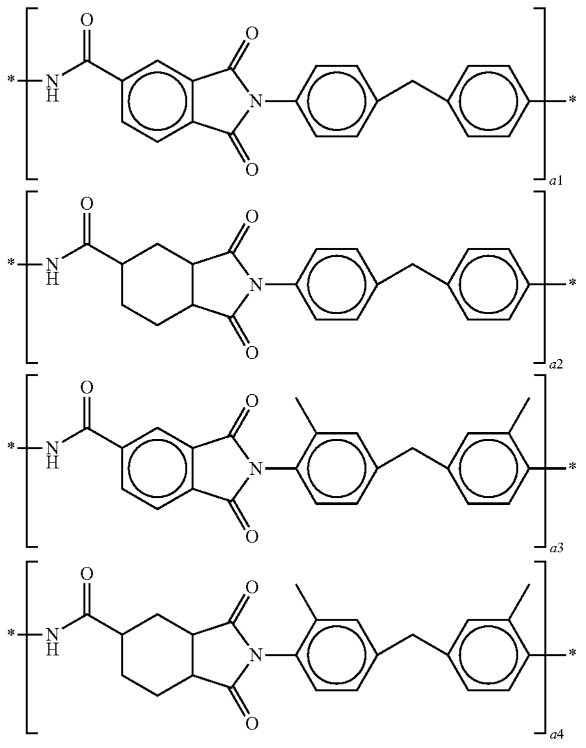

The resultant polyimide resin was a copolymer having the structures a1 to a4 above, and a1:a2:a3:a4 was 35:15:35:15 on a molar basis. Each of the segments had the following molality.

a1: 0.965 mmol/g a2: 0.413 mmol/g a3: 0.965 mmol/g a4: 0.413 mmol/g

Synthesis Example 4 (as above)

Into a flask equipped with a stirrer, a thermometer, and a condenser, 1386.56 g of GBL, 52.2 g (0.3 mol) of TDI (2,4-tolylene diisocyanate), 184.8 g (0.7 mol) of DMBPDI (4,4'-diisocyanate-3,3'-dimethyl-1,1'-biphenyl), 138.24 g (0.72 mol) of TMA, and 59.4 g (0.3 mol) of TMA-H were inserted. The temperature was increased to 160° C. under stirring without generating heat for 2 hours, and the materials were caused to react with each other at that temperature for 5 hours. The reaction proceeded with bubbling of carbonic acid gas and a brown clear liquid was obtained in the system. The viscosity at 25° C. was 8 Pa·s (25° C.) and the resin solid content was 17%. This product is referred to as a polyimide resin (A-4) solution (a resin composition obtained by dissolving a polyimide resin in γ-butyrolactone). The acid value of the resin solution was 2.9 (KOHmg/g), and thus the average molecular weight was concluded to be 6577.

The resultant polyimide resin (A-4) solution was applied onto a KBr plate and the solvent was volatilized to obtain a sample. As a result of the measurement of the infrared absorption spectrum of the sample, an absorption at 2270 cm-1, which indicates characteristic absorption of an isocyanate group, was completely lost and the characteristic absorption of an imide ring was confirmed at 725 cm-1, 1780 cm-1, and 1720 cm-1. The amount of carbonic acid gas generated was 88 g (2 mol), which was obtained by measuring a change in the mass of the materials inserted into the flask. Thus, it was concluded that 2 mol of the isocyanate group, which was the total amount of the isocyanate group, was completely converted into an imide bond and an amide bond.

As a result of the analysis of C13-NMR, a polyimide resin represented by the following structure whose composition ratio of the raw materials was TDI:DMBPDI:TMA:TMA-H=3:7:7.2:3 on a molar basis was confirmed.

[Chem. 28]

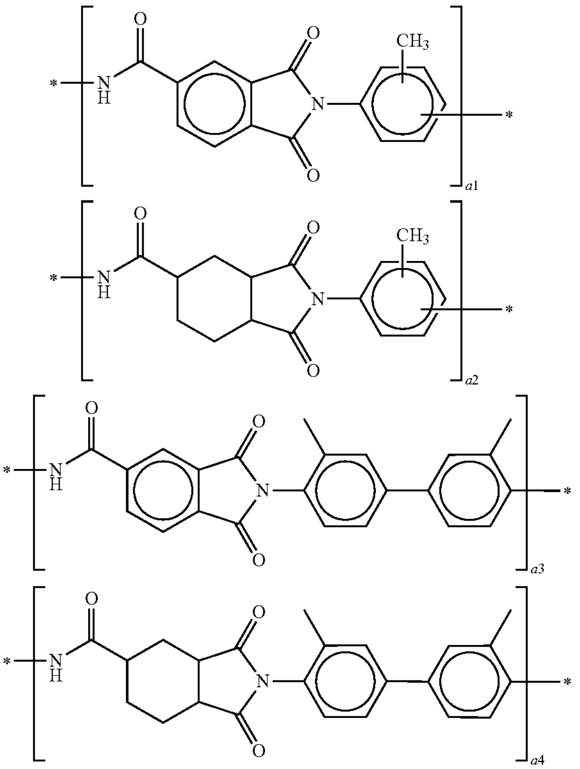

The resultant polyimide resin was a copolymer having the structures a1 to a4 above, and a1:a2:a3:a4 was 0.216:0.09:0.504:0.21 on a molar basis. Each of the segments had the following molality.

a1: 0.623 mmol/g
a2: 0.260 mmol/g
a3: 1.453 mmol/g
a4: 0.606 mmol/g

Synthesis Example 5 (as above)

Into a flask equipped with a stirrer, a thermometer, and a condenser, 4951 g of EDGA (ethyl diglycol acetate), 2760 g (12 mol as an isocyanate group) of polyisocyanate having an isocyanurate ring derived from isophorone diisocyanate (the content of an isocyanate group: 18.2% and the content of triisocyanate having an isocyanurate ring: 85%), and 2191 g (2 mol as a hydroxyl group) of Polytail HA [hydrogenated liquid polybutadiene having hydroxyl groups at both terminals, a number-average molecular weight of 2100, and a hydroxyl value of 51.2 mgKOH/g and manufactured by Mitsubishi Chemical Corporation] were inserted. The temperature was increased to 80° C. under stirring without generating heat. A urethane-forming reaction was performed at that temperature for 3 hours. Subsequently, 1536 g of EDGA and 1536 g (8 mol) of TMA were further inserted. The temperature was increased to 160° C., and the reaction was caused to proceed for 4 hours to obtain a pale brown polyimide resin (A-5) solution (resin composition obtained by dissolving a polyimide resin in EDGA). The resin solid content was 48.2%. The acid value of the resin solution was 38.1 (KOHmg/g), and, from the result of GPC, the number-average molecular weight was 5900 and the weight-average molecular weight was 24000.

The resultant polyimide resin (A-5) solution was applied onto a KBr plate and the solvent was volatilized to obtain a sample. As a result of the measurement of the infrared absorption spectrum of the sample, an absorption at 2270 cm-1, which indicates characteristic absorption of an isocyanate group, was completely lost, and the characteristic absorption of an imide ring was confirmed at 725 cm-1, 1780 cm-1, and 1720 cm-1, the characteristic absorption of an isocyanurate ring was confirmed at 1690 cm-1 and 1460 cm-1, and the characteristic absorption of a urethane bond was confirmed at 1550 cm-1. The acid value of the polyimide resin was 79 mgKOH/g on a solid content basis, and the molality of the isocyanurate ring was 0.66 mmol/g (on a resin solid content basis).

Example 1

A thermosetting resin composition 1 of the present invention was prepared so as to have the composition shown in Table 1. The composition was prepared by performing mixing and stirring at room temperature. The solubility in a solvent, solubility over time, application workability, heat resistance, flame retardancy, mechanical properties, and dimensional stability of the resultant thermosetting resin composition 1 were evaluated by the following methods. Table 3 shows the results.

(1) Solubility in Solvent and Solubility Over Time

A storage stability test was performed by evaluating the solubility of the thermosetting resin composition 1 in a solvent immediately after the preparation and after long-term standing. Twenty-five milliliters of a thermosetting composition immediately after the preparation was inserted into a vial with a cap. The external appearance was observed and evaluated in accordance with the evaluation criteria below. This was defined as the solubility of the thermosetting resin composition 1 in a solvent immediately after the preparation. Subsequently, the vial with a cap containing the thermosetting resin composition 1 was left to stand at 25° C. for 7 days. The external appearance of the thermosetting resin composition 1 was observed and the solubility in a solvent over time was evaluated in accordance with the evaluation criteria below.

Good: With transparency and fluidity

Fair: With fluidity but turbidity

Poor: Applicable to at least one of no transparency, no fluidity, and separation (2) Evaluation of Application Workability The thermosetting resin composition was applied onto a tin plate using an applicator with 0.152 mil at room temperature. The external appearance of the applied thermosetting resin composition was evaluated in accordance with the evaluation criteria below. In Examples and Comparative Examples, when the prepared resin solution contains a solid component, the temperature of the resin solution was increased to 120° C. to dissolve the solid component and then the thermosetting resin composition was applied.

Good: Glossy flat surface with transparency

Fair: Flat surface with no transparency

Poor: Uneven surface with no transparency (3) Evaluation of Heat Resistance (1)

A thermosetting resin composition was applied onto a glass epoxy substrate on which copper foil was laminated so that the thickness of a cured thermosetting resin composition was 30 μm. Drying was performed with a dryer at 200° C. for 60 minutes, and then the temperature was decreased to room temperature and thus a test piece was prepared. This test piece was immersed in a molten solder bath at 260° C. for 30 seconds, and then the test piece was cooled to room temperature. This immersion operation in the solder bath was performed three times in total, and the external appearance of the cured film was evaluated in accordance with the evaluation criteria below. The heat resistance was also evaluated by measuring Tg as described below. High Tg means high heat resistance.

Good: No defects are externally observed on a film.

Fair: Defects such as swelling and peeling are slightly observed on a film.

Poor: Defects such as swelling and peeling are observed on the entire surface of a film.

(4) Evaluation of Heat Resistance (2)

Evaluation was performed through pyrolysis measurement.

<Preparation of Test Piece>

The thermosetting resin composition 1 was applied onto a tin substrate so that the resultant film had a thickness of 30 μm. Subsequently, the coated substrate was dried with a dryer at 50° C. for 30 minutes, with a dryer at 100° C. for 30 minutes, and then with a dryer at 200° C. for 60 minutes to form a film. After the substrate was cooled to room temperature, the film was detached from the substrate to obtain a measurement sample.

<Pyrolysis Measurement Method>

Pyrolysis measurement was performed by thermogravimetry-differential thermal analysis (TG-DGA). Specifically, the thermogravimetric reduction rate at 500° C. was measured using TG/DTA 6200 manufactured by SII NanoTechnology Inc. In the measurement, the sample was cut so as to have a size that can be contained in an aluminum container for measurement (70 μl). The initial mass of the sample was adjusted to be 5.5 to 5.8 mg. In the measurement, the temperature was increased by heating in a nitrogen stream from room temperature to 500° C. at a temperature increasing rate of 10° C./minute. The evaluation was performed in terms of reduction percentage of mass. Small reduction percentage means high heat resistance.

(5) Evaluation of Mechanical Properties

The mechanical properties were evaluated through elastic modulus, breaking strength, and breaking elongation measured from a tensile test of a film.

<Preparation of Test Piece>

A thermosetting resin composition was applied onto a tin substrate so that the resultant film had a thickness of 30 μm. Subsequently, the coated substrate was dried with a dryer at 50° C. for 30 minutes, with a dryer at 100° C. for 30 minutes, and then with a dryer at 200° C. for 60 minutes to form a film. After the substrate was cooled to room temperature, the film was cut into a predetermined size and detached from the substrate to obtain a measurement sample.

<Measurement Method of Tensile Test>

Five measurement samples were prepared, and a tensile test was performed under the conditions below to determine elastic modulus, breaking strength, and breaking elongation. Low elastic modulus means a highly flexible film. High breaking elongation means a highly flexible film. High breaking strength means a tough film.

Measurement equipment: Tensilon manufactured by TOYO BALDWIN Co., Ltd.

Shape of sample: 10 mm×70 mm

Distance between chucks: 20 mm

Cross head speed: 10 mm/min

Measurement atmosphere: 22° C., 45% RH (6) Evaluation of Dimensional Stability

<Preparation of Test Piece>

A thermosetting resin composition was applied onto a tin substrate so that the cured thermosetting resin composition had a thickness of 30 μm. After drying was performed with a dryer at 70° C. for 20 minutes, the thermosetting resin composition was cured at 200° C. for 1 hour and then cooled. The cured film was detached and then cut so as to have a width of 5 mm and a length of 30 mm. Thus, a measurement sample was obtained.

<Measurement Method of TG and Coefficient of Linear Expansion>

TMA (thermal mechanical analysis) was performed using Thermal Analysis System TMA-SS6000 manufactured by Seiko Instruments Inc. under the conditions that the length of the sample was 10 mm, the temperature increasing rate was 10° C./minute, and the load was 30 mN. An inflection point of a temperature-dimensional change curve obtained in the TMA measurement was determined, and the temperature at the inflection point was defined as TG. The coefficient of linear expansion was determined from a change in the length of the sample in temperature ranges of 50 to 60° C. and 110 to 120° C. Low coefficient of linear expansion means high dimensional stability.

(7) Evaluation of Flame Retardancy

<Preparation of Test Piece>

A thermosetting resin composition was applied onto a tin substrate so that the cured thermosetting resin composition had a thickness of 30 μm. After drying was performed with a dryer at 70° C. for 20 minutes, the thermosetting resin composition was cured at 200° C. for 1 hour and then cooled. The cured film was detached and then cut so as to have a width of 10 mm and a length of 40 mm. The film was folded into two in a longitudinal direction to obtain a measurement sample.

<Evaluation Method of Flame Retardancy>

The folded film sample was horizontally fixed by pinching one end of the sample with a clamp. The other end of the sample was ignited by slowly bringing flame of a lighter to the other end. Evaluation was performed in accordance with the criteria below.

Good: Film sample ignites, but flame is immediately extinguished.

Fair: Film sample ignites, but flame is extinguished before reaching clamp.

Poor: Film sample burns out to portion pinched by clamp.

Examples 2 to 12 and Comparative Examples 1 to 5

Thermosetting resin compositions 2 to 12 and thermosetting resin compositions 1' to 5' for comparison were obtained in the same manner as in Example 1, except that they were prepared so as to have the compositions shown in Tables 1 to 3. The same evaluations as those of Example 1 were performed, and Tables 4 to 6 show the results.

Comparative Example 6

Into a reactor equipped with a nitrogen gas-introducing pipe and a cooling device, 0.5 mol of trimellitic anhydride (manufactured by MITSUBISHI GAS CHEMICAL Company, Inc.), 0.5 mol of sebacic acid (manufactured by Hokoku Corporation), 0.46 mol of MILLIONATE MT (manufactured by Nippon Polyurethane Industry Co., Ltd.), 0.5 mol of CORONATE T-100 (manufactured by Nippon Polyurethane Industry Co., Ltd.), and cyclohexanone (manufactured by KANTO DENKA KOGYO CO., LTD.) serving as a solvent were inserted. The materials were caused to react with each other at a solid content of 50% at 140° C. for 1 hour. Then, 0.02 mol of 1,8-diazabicyclo[5.4.0]-7-undecene serving as a catalyst was slowly added thereto and a reaction was caused to proceed at 140° C. for 3 hours. To adjust the molecular weight, 0.02 mol of MILLIONATE MT was further added and a reaction was caused to proceed at 140° C. for 2 hours. After cooling was performed, the product was diluted with cyclohexanone so as to have a solid content of 25% by mass. Thus, a polyamide-imide resin varnish was obtained. This resin composition is referred to as a thermosetting resin composition 6' for comparison.

The same evaluations as those of Example 1 were performed using the thermosetting resin composition 6' for comparison, and Table 7 shows the results.

Comparative Example 7

Into a 500 ml four-neck flask equipped with a nitrogen gas-introducing pipe, a stirrer, a distilling outlet, and a thermometer, 270 g of GBL; 30 g of xylene; 20.9 g (0.051 mol) of 1,2-ethylenebis(anhydrotrimellitate) (TMEG) (a1) and 18.2 g (0.051 mol) of 3,3',4,4'-diphenylsulfonetetracarboxylic acid dianhydride (DSDA) (a2) serving as (A) components; and 24.6 g (0.060 mol) of 2,2-bis[4-(4-aminophenoxy)phenyl]propane (BAPP) (b1) and 16.0 g (0.040 mol) of "JEFFAMINE D-400" manufactured by HUNTSMAN (average molecular weight: 400) (b2) serving as (B) components were inserted. The temperature was increased to 180° C. under stirring in a nitrogen stream. An imidization reaction was caused to proceed for 5 hours while produced water was distilled to the outside of the system. Thus, a reaction solution with a resin concentration of about 20% by mass after the completion of polyimidization reaction was obtained. This resin composition is referred to as a thermosetting resin composition 7' for comparison.

The same evaluations as those of Example 1 were performed using the thermosetting resin composition 7' for comparison, and Table 7 shows the results.

TABLE 1

| Example | 1 | 2 | 3 | 4 | 5 | 6 |
|---|---|---|---|---|---|---|
| Resin composition | 1 | 2 | 3 | 4 | 5 | 6 |
| Polyimide resin (A-1) | 90 | 90 | 90 | | | |
| Polyimide resin (A-2) | | | | 90 | 90 | 90 |
| TEPBIZ | 10 | | | 10 | | |
| TRBB | | 10 | | | 10 | |
| TBBP | | | 10 | | | 10 |

TEPBIZ: 2-ethyl-4-methyl imidazolium tetraphenylborate
TRBB: pyridine triphenylborane
TBBP: phenylboronic acid anhydride (trimer)

TABLE 2

| Example | 7 | 8 | 9 | 10 | 11 | 12 |
|---|---|---|---|---|---|---|
| Resin composition | 7 | 8 | 9 | 10 | 11 | 12 |
| Polyimide resin (A-3) | 90 | 90 | 85 | | | |
| Polyimide resin (A-4) | | | | 90 | 90 | 95 |
| TEPBIZ | 10 | | | 10 | | |
| TRBB | | 10 | 15 | | 10 | |
| TBBP | | | | | | 5 |

TABLE 3

| | Comparative Example | | | | |
|---|---|---|---|---|---|
| | 1 | 2 | 3 | 4 | 5 |
| Resin Composition | 1' | 2' | 3' | 4' | 5' |
| Polyimide resin (A-1) | 100 | | | | |
| Polyimide resin (A-2) | | 100 | | | |
| Polyimide resin (A-3) | | | 100 | | |
| Polyimide resin (A-4) | | | | 100 | |
| Polyimide resin (A-5) | | | | | 80 |
| CNE | | | | | 20 |
| TPP | | | | | 0.5 |

CNE: cresol novolac epoxy resin, epoxy equivalent: 214, softening point: 80° C.
TPP: triphenylphosphine

TABLE 4

| | Example | | | | | |
|---|---|---|---|---|---|---|
| | 1 | 2 | 3 | 4 | 5 | 6 |
| Resin composition | 1 | 2 | 3 | 4 | 5 | 6 |
| Solubility in solvent | Good | Good | Good | Good | Good | Good |
| Solubility in solvent over time | Good | Good | Good | Good | Good | Good |
| Application workability | Good | Good | Good | Good | Good | Good |
| Heat resistance 1 | Good | Good | Good | Good | Good | Good |
| Heat resistance 2 (reduction percentage) | 19 | 18 | 17 | 17 | 16 | 17 |
| TG | 332 | 322 | 321 | 329 | 327 | 322 |
| Coefficient of linear expansion (50 to 60° C.) | 31 | 32 | 33 | 34 | 35 | 33 |

TABLE 4-continued

| | Example | | | | | |
|---|---|---|---|---|---|---|
| | 1 | 2 | 3 | 4 | 5 | 6 |
| Coefficient of linear expansion (110 to 120° C.) | 48 | 41 | 46 | 44 | 43 | 45 |
| Mechanical properties Breaking elongation (%) | 32 | 28 | 23 | 34 | 38 | 34 |
| Breaking strength (MPa) | 141 | 135 | 136 | 149 | 132 | 135 |
| Flame retardancy | Good | Good | Good | Good | Good | Good |

TABLE 5

| | Example | | | | | |
|---|---|---|---|---|---|---|
| | 7 | 8 | 9 | 10 | 11 | 12 |
| Resin composition | 7 | 8 | 9 | 10 | 11 | 12 |
| Solubility in solvent | Good | Good | Good | Good | Good | Good |
| Solubility in solvent over time | Good | Good | Good | Good | Good | Good |
| Application workability | Good | Good | Good | Good | Good | Good |
| Heat resistance 1 | Good | Good | Good | Good | Good | Good |
| Heat resistance 2 (reduction percentage) | 18 | 17 | 18 | 17 | 16 | 16 |
| TG | 354 | 350 | 352 | 353 | 351 | 337 |
| Coefficient of linear expansion (50 to 60° C.) | 21 | 25 | 19 | 22 | 23 | 39 |
| Coefficient of linear expansion (110 to 120° C.) | 36 | 39 | 37 | 36 | 37 | 33 |
| Mechanical properties Breaking elongation (%) | 28 | 23 | 20 | 24 | 25 | 25 |
| Breaking strength (MPa) | 149 | 140 | 143 | 144 | 140 | 149 |
| Flame retardancy | Good | Good | Good | Good | Good | Good |

TABLE 6

| | Comparative Example | | | | |
|---|---|---|---|---|---|
| | 1 | 2 | 3 | 4 | 5 |
| Resin composition | 1' | 2' | 3' | 4' | 5' |
| Solubility in solvent | Good | Good | Good | Good | Good |
| Solubility in solvent over time | Good | Good | Good | Good | Gelation |
| Application workability | Good | Good | Good | Good | Good |
| Heat resistance | Good | Good | Good | Good | Good |
| Heat resistance 2 (reduction percentage) | 35 | 31 | 36 | 34 | 85 |
| TG | 240 | 242 | 257 | 245 | 237 |
| Coefficient of linear expansion (50 to 60° C.) | 49 | 46 | 47 | 47 | 125 |
| Coefficient of linear expansion (110 to 120° C.) | 61 | 54 | 55 | 52 | 135 |
| Mechanical properties | | | | | |
| Breaking elongation (%) | 12 | 15 | 17 | 20 | 8 |
| Breaking strength (MPa) | 96 | 99 | 97 | 120 | 57 |
| Flame retardancy | Fair | Fair | Fair | Fair | Poor |

TABLE 7

| | Comparative Example | |
|---|---|---|
| | 6 | 7 |
| Resin composition | 6' | 7' |
| Solubility in solvent | Good | Good |
| Solubility in solvent over time | Good | Good |
| Application workability | Good | Good |
| Heat resistance | Fair | Poor |
| Heat resistance 2 (reduction percentage) | 23 | 24 |
| TG | 191 | 84 |
| Coefficient of linear expansion (50 to 60° C.) | 69 | 78 |
| Coefficient of linear expansion (110 to 120° C.) | 86 | 240 |
| Mechanical properties | | |
| Breaking elongation (%) | 12 | 35 |
| Breaking strength (MPa) | 76 | 67 |
| Flame retardancy | Poor | Poor |

The invention claimed is:

1. A thermosetting resin composition comprising a polyimide resin (A) and at least one boron compound (B) selected from compounds represented by general formulae (b1) and (b2) below,

[Chem. 1]

(b1)

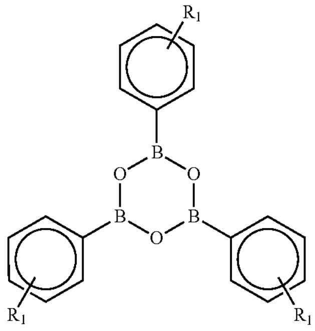

in the formula, $R_1$'s each independently represent a hydrogen atom, an alkyl group having 1 to 4 carbon atoms, or an alkoxy group having 1 to 4 carbon atoms:

[Chem. 2]

(b2)

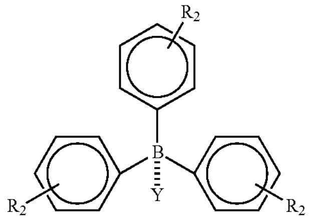

in the formula, $R_2$'s each independently represent hydrogen, an alkyl group having 1 to 4 carbon atoms, or an alkoxy group having 1 to 4 carbon atoms; and Y represents a nitrogen-containing heterocyclic compound;

wherein at least one polyimide resin (A) selected from structural units represented by general formula (a1), (a2) and combination thereof

[Chem. 3]

(a1)

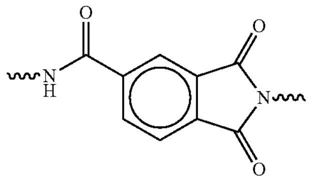

[Chem. 7]

(a2)

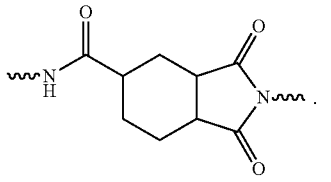

2. The thermosetting resin composition according to claim 1, wherein the boron compound (B) is a boron compound represented by the general formula (b2).

3. The thermosetting resin composition according to claim 1, wherein Y of the boron compound represented by the general formula (b2) is pyridine.

4. The thermosetting resin composition according to claim 1, wherein the content of the boron compound (B) is 0.5 to 30 parts by mass relative to 100 parts by mass of the polyimide resin (A).

5. The thermosetting resin composition according to claim 1, wherein the polyimide resin (A) is a polyimide resin having one or more structures represented by general formulae below

[Chem. 4]

(a1-3)

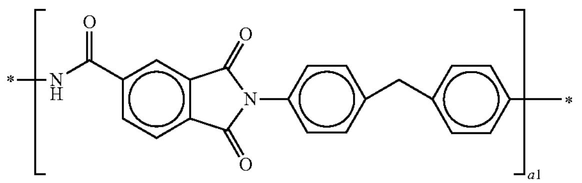

(a1-4)

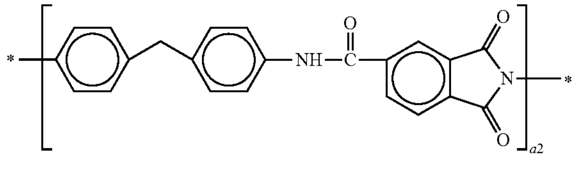

-continued

[Chem. 5]

(a1-5)

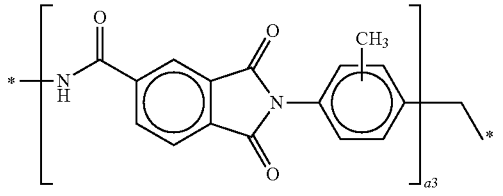

(a1-6)

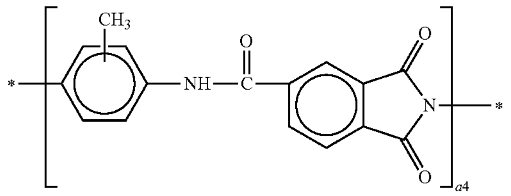

[Chem. 6]

(a1-7)

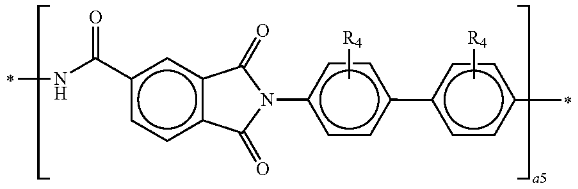

(a1-8)

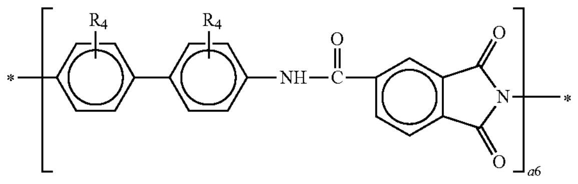

* in the structures represented by the general formulae (a1-3) to (a1-8) represents a bonding point; $R_4$'s each independently represent a hydrogen atom or a hydrocarbon group having 1 to 9 carbon atoms; and a1, a2, a3, a4, a5, and a6 each represent the number of repetitions of a structural unit in parentheses and are each 1 to 1000.

6. The thermosetting resin composition according to claim 1, wherein the polyimide resin having the imide five-membered ring structure directly connected to the cycloaliphatic hydrocarbon structure is a polyimide resin having one or more structures represented by general formulae below

[Chem. 8]

(a2-3)

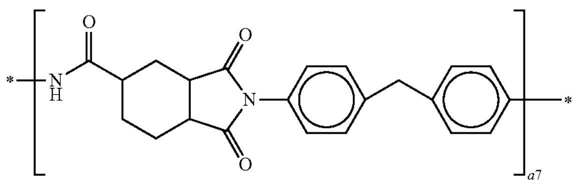

-continued (a2-4)

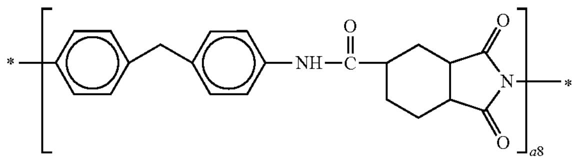

[Chem. 9]

(a2-5)

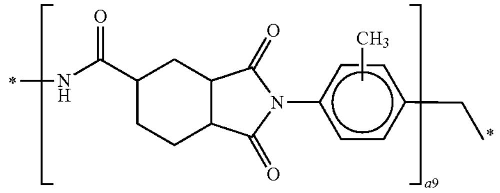

(a2-6)

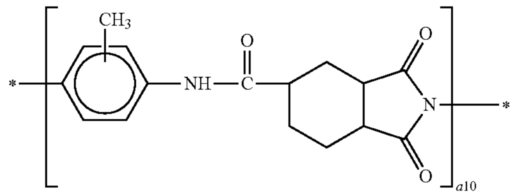

[Chem. 10]

(a2-7)

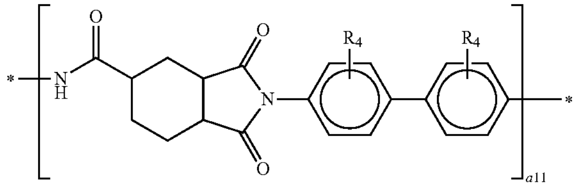

(a2-8)

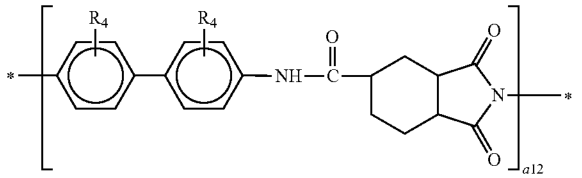

*in the structures represented by the general formulae (a2-3) to (a2-8) represents a bonding point; $R_4$'s each independently represent a hydrogen atom or a hydrocarbon group having 1 to 9 carbon atoms; and a7, a8, a9, a10, a11, and a12 each represent the number of repetitions of a structural unit in parentheses and are each 1 to 1000.

7. The thermosetting resin composition according to claim 5 or 6, wherein $R_4$'s in the structures represented by the general formulae (a1-7), (a1-8), (a2-7), and (a2-8) represent a methyl group.

8. The thermosetting resin composition according to claim 1, wherein the polyimide resin having a divalent structural unit represented by the general formula (a2) is a polyimide resin having the structure represented by the general formula (a2) in a molality of 0.02 to 2.0 mmol/g based on the solid content by mass of the polyimide resin.

9. The thermosetting resin composition according to claim 1, wherein the polyimide resin (A) is a polyimide resin having structures represented by general formula (a1-7) or (a1-8) below and general formula (a2-7) or (a2-8) below (a1-7)

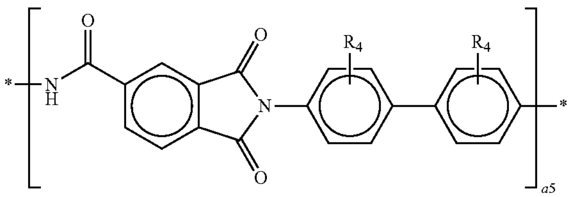

(a1-8)

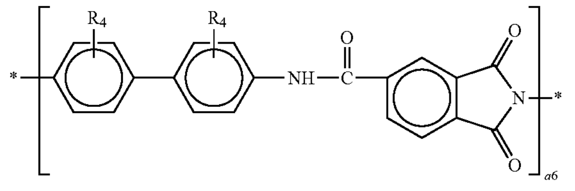

(a2-7)

[Chem. 12]

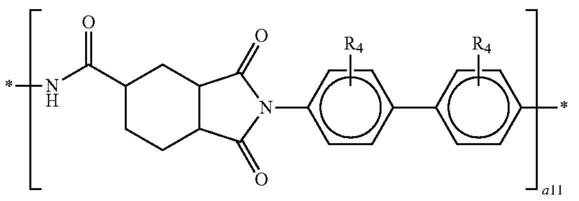

(a2-8)

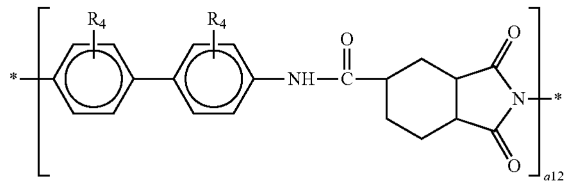

*in the structures represented by the general formulae (a1-7), (a1-8), (a2-7), and (a2-8) represents a bonding point; $R_4$'s each independently represent a hydrogen atom or a hydrocarbon group having 1 to 9 carbon atoms; and a5, a6, a11, and a12 each represent the number of repetitions of a structural unit in parentheses and are each 1 to 1000.

10. The thermosetting resin composition according to claim 1, wherein a terminal group of the polyimide resin (A) is carboxylic acid and/or carboxylic acid anhydride, and an acid value is 1 to 50 on a solid content basis.

11. The thermosetting resin composition according to claim 1, wherein the polyimide resin is a polyimide resin that is soluble in gamma-butyrolactone when the polyimide resin is dissolved in gamma-butyrolactone at 25° C. so as to have a concentration of 10% by mass.

12. A cured product obtained by curing the thermosetting resin composition according to claim 1.

13. A thermosetting resin composition comprising a polyimide resin (A) and a boron compound (B) represented by general formula (b3) below, wherein the one polyimide resin (A) selected from structural unit represented by general formula (a1), (a2) and combination thereof

[Chem. 13]

(b3)

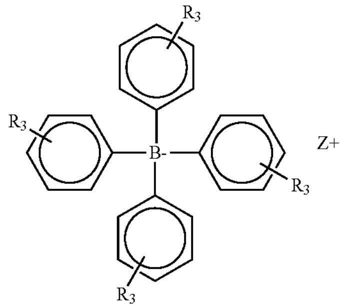

in the formula, $R_3$'s each independently represent a hydrogen atom, an alkyl group having 1 to 4 carbon atoms, or an alkoxy group having 1 to 4 carbon atoms; and Z represents a nitrogen-containing heterocyclic compound

[Chem. 14]

(a1)

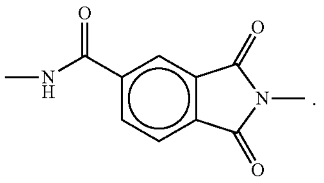

[Chem. 18]

(a2)

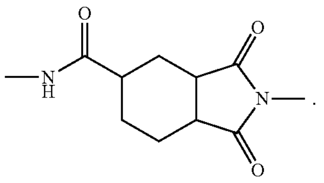

14. The thermosetting resin composition according to claim 13, wherein Z+ of the boron compound represented by the general formula (b3) is an imidazolium salt.

15. The thermosetting resin composition according to claim 13, wherein the content of the boron compound (B) is 0.5 to 30 parts by mass relative to 100 parts by mass of the polyimide resin.

16. The thermosetting resin composition according to claim 13, wherein the polyimide resin (A) is a polyimide resin having one or more structures represented by general formulae below (a1-3)

[Chem. 15]

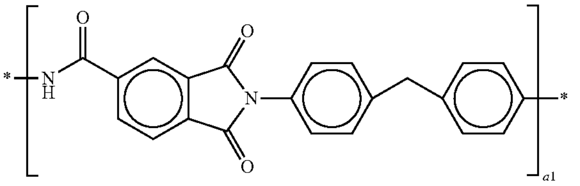

(a1-4)

[Chem. 16]

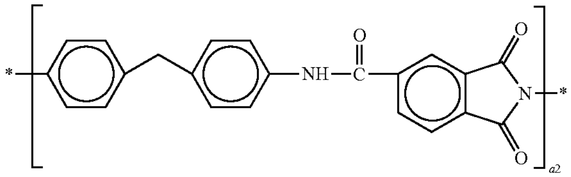

(a1-5)

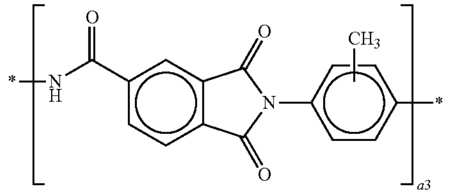

(a1-6)

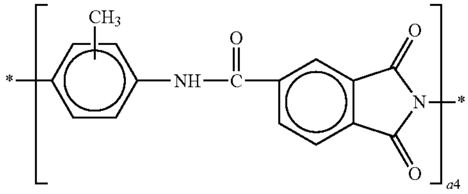

(a1-7)

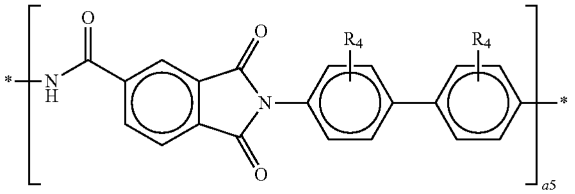

(a1-8)

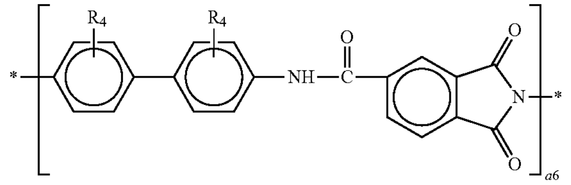

*in the structures represented by the general formulae (a1-3) to (a1-8) represents a bonding point; $R_4$'s each independently represent a hydrogen atom or a hydrocarbon group having 1 to 9 carbon atoms; and a1, a2, a3, a4, a5, and a6 each represent the number of repetitions of a structural unit in parentheses and are each 1 to 1000.

17. The thermosetting resin composition according to claim 16, wherein $R_4$'s in the structures represented by the general formulae (a1-7), (a1-8), (a2-7), and (a2-8) represent a methyl group.

18. The thermosetting resin composition according to claim 13, wherein the polyimide resin having the imide five-membered ring structure directly connected to the cycloaliphatic hydrocarbon structure is a polyimide resin having one or more structures represented by general formulae below

[Chem. 19]

(a2-3)

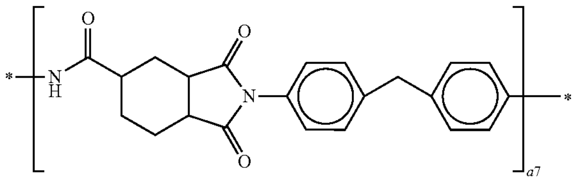

(a2-4)

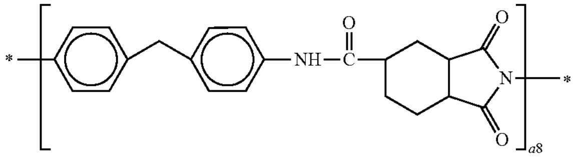

[Chem. 20]

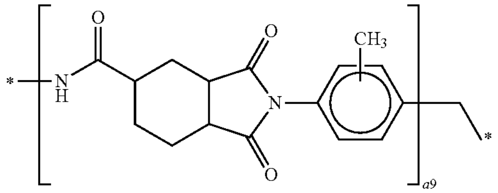

(a2-6)

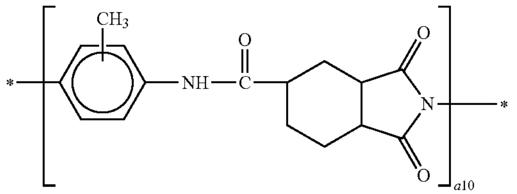

[Chem. 21]

(a2-7)

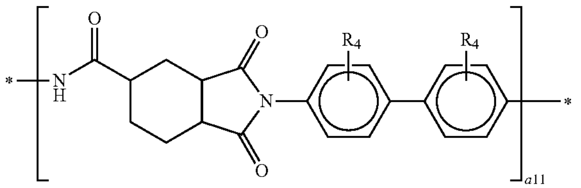

-continued (a2-8)

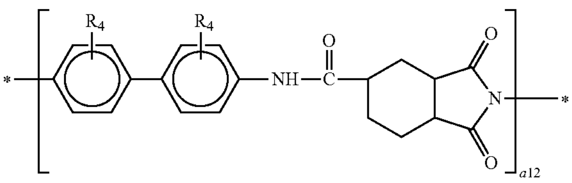

*in the structures represented by the general formulae (a2-3) to (a2-8) represents a bonding point; $R_4$'s each independently represent a hydrogen atom or a hydrocarbon group having 1 to 9 carbon atoms; and a7, a8, a9, a10, a11, and a12 each represent the number of repetitions of a structural unit in parentheses and are each 1 to 1000.

19. The thermosetting resin composition according to claim 13, wherein the polyimide resin having a divalent structural unit represented by the general formula (a2) is a polyimide resin having the structure represented by the general formula (a2) in a molality of 0.02 to 2.0 mmol/g based on the solid content by mass of the polyimide resin.

20. The thermosetting resin composition according to claim 13, wherein the polyimide resin (A) is a polyimide resin having structures represented by general formula (a1-7) or (a1-8) below and general formula (a2-7) or (a2-8) below, (a1-7)

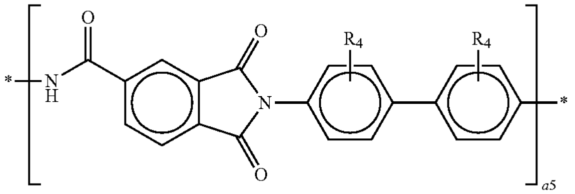

(a1-8)

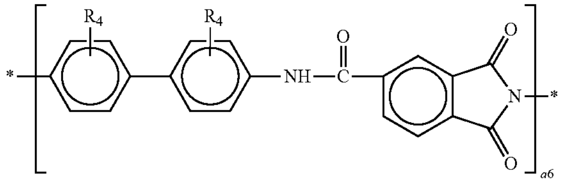

(a2-7)

[Chem. 23]

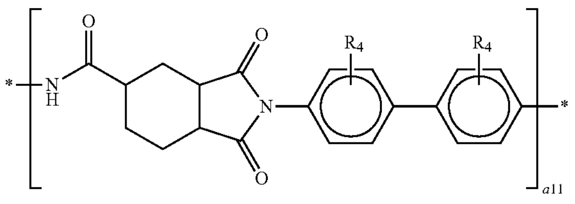

-continued (a2-8)

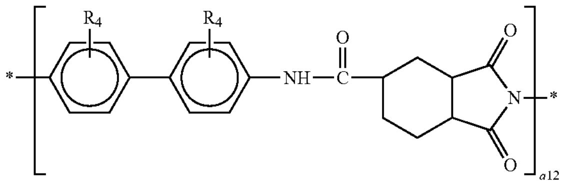

*in the structures represented by the general formulae (a1-7), (a1-8), (a2-7), and (a2-8) represents a bonding point; $R_4$'s each independently represent a hydrogen atom or a hydrocarbon group having 1 to 9 carbon atoms; and a5, a6, a11, and a12 each represent the number of repetitions of a structural unit in parentheses and are each 1 to 1000.

21. A cured product obtained by curing the thermosetting resin composition according to claim 20.

22. The thermosetting resin composition according to claim 13, wherein a terminal group of the polyimide resin (A) is carboxylic acid and/or carboxylic acid anhydride, and an acid value is 1 to 50 on a solid content basis.

23. The thermosetting resin composition according to claim 22, wherein the polyimide resin is a polyimide resin that is soluble in gamma-butyrolactone when the polyimide resin is dissolved in gamma-butyrolactone at 25° C. so as to have a concentration of 10% by mass.

* * * * *